US011726711B2

United States Patent
Wang et al.

(10) Patent No.: US 11,726,711 B2
(45) Date of Patent: Aug. 15, 2023

(54) DESTRUCTIVE READ TYPE MEMORY CIRCUIT AND INFORMATION PROCESSING CIRCUIT AND APPARATUS UTILIZING DESTRUCTIVE READ TYPE MEMORY CIRCUIT

(71) Applicant: KIOXIA CORPORATION, Tokyo (JP)

(72) Inventors: Zheye Wang, Kawasaki Kanagawa (JP); Akiyuki Kaneko, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 78 days.

(21) Appl. No.: 17/184,218

(22) Filed: Feb. 24, 2021

(65) Prior Publication Data
US 2021/0279005 A1    Sep. 9, 2021

(30) Foreign Application Priority Data
Mar. 4, 2020  (JP) .................................. 2020-036673

(51) Int. Cl.
*G06F 3/06*    (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 2212/7202; G06F 12/0246
See application file for complete search history.

(56) References Cited

U.S. PATENT DOCUMENTS

| 8,327,068 | B2* | 12/2012 | Nakanishi ........... G06F 11/1666 |
| | | | 711/E12.083 |
| 8,811,071 | B2 | 8/2014 | Alam et al. |
| 9,218,865 | B2 | 12/2015 | Andre et al. |
| 9,348,697 | B2 | 5/2016 | Hoya |
| 9,785,552 | B2 | 10/2017 | Kanno et al. |
| 10,268,591 | B2 | 4/2019 | Andre et al. |
| 2008/0307152 | A1* | 12/2008 | Nakanishi ........... G06F 12/0638 |
| | | | 711/E12.083 |

(Continued)

FOREIGN PATENT DOCUMENTS

JP    2019133703 A    8/2019

OTHER PUBLICATIONS

Hiroaki Tanizaki et al., A high-density and high-speed 1T-4MTJ MRAM with Voltage Offset Self-Reference Sensing Scheme, IEEE, 2006, pp. 303-306.

*Primary Examiner* — Tasnima Matin
(74) *Attorney, Agent, or Firm* — Kim & Stewart LLP

(57) ABSTRACT

According to one embodiment, a memory circuit includes a plurality of nonvolatile memory cells and a control circuit. Each of the plurality of nonvolatile memory cells loses stored data when the stored data is read. The control circuit reads data from a first memory cell among the plurality of memory cells as designated by a first instruction but does not write the data read from the first memory cell back to the first memory cell after the first instruction is received. The control circuit reads data from a second memory cell among the plurality of memory cells as designated by a second instruction and writes the data read from the second memory cell back to the second memory cell after the second instruction is received.

20 Claims, 18 Drawing Sheets

(56) References Cited

U.S. PATENT DOCUMENTS

| | | | |
|---|---|---|---|
| 2012/0195112 A1* | 8/2012 | Alam | G11C 11/1673 |
| | | | 365/158 |
| 2017/0315920 A1* | 11/2017 | Andre | G11C 7/1042 |
| 2020/0089567 A1* | 3/2020 | Takeda | G06F 11/1048 |
| 2020/0257473 A1* | 8/2020 | Kim | G06F 3/0604 |
| 2021/0096930 A1* | 4/2021 | Shafi | G06F 12/0868 |
| 2022/0020414 A1* | 1/2022 | Yudanov | G06F 12/0802 |

* cited by examiner

FIG. 7
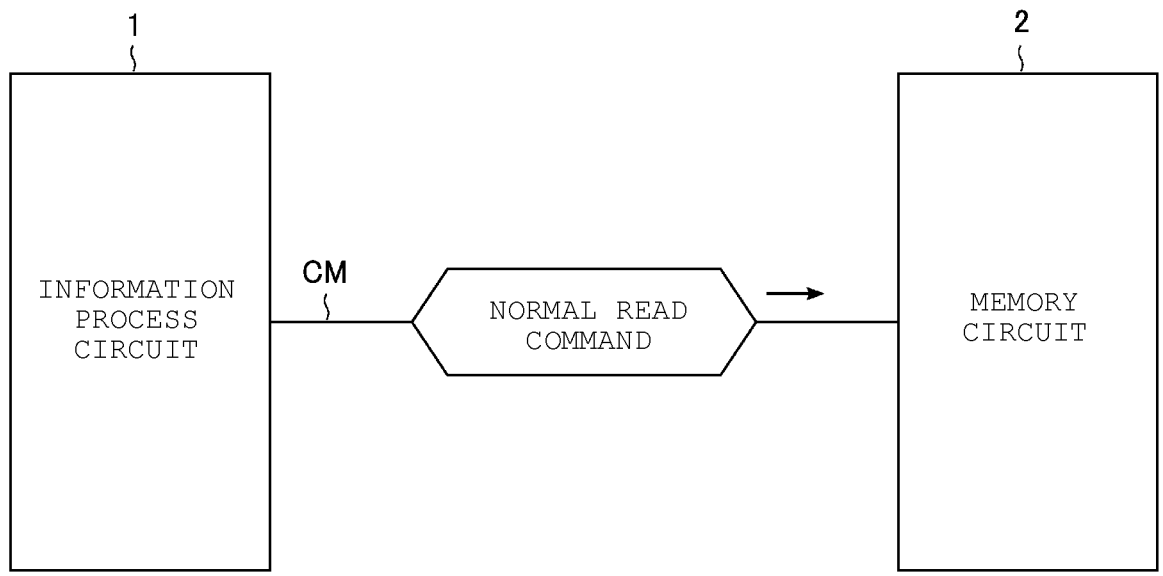
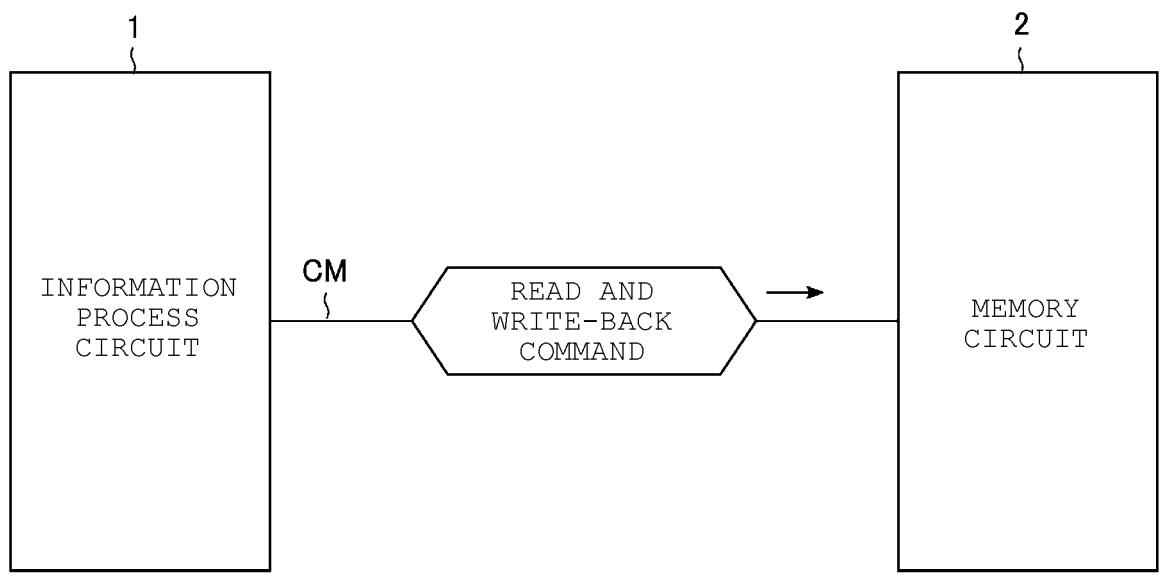

DESTRUCTIVE READ TYPE MEMORY CIRCUIT AND INFORMATION PROCESSING CIRCUIT AND APPARATUS UTILIZING DESTRUCTIVE READ TYPE MEMORY CIRCUIT

CROSS-REFERENCE TO RELATED APPLICATION

This application is based upon and claims the benefit of priority from Japanese Patent Application No. 2020-036673, filed Mar. 4, 2020, the entire contents of which are incorporated herein by reference.

FIELD

Embodiments described herein relate generally to a memory circuit, an information processing circuit, and an information processing apparatus.

BACKGROUND

It is known there is a memory circuit from which data can be lost when data is read from a memory cell.

BRIEF DESCRIPTION OF THE DRAWINGS

FIG. 7 depicts aspects of a signal flow on a memory bus of a first embodiment.

DETAILED DESCRIPTION

Figure 1:
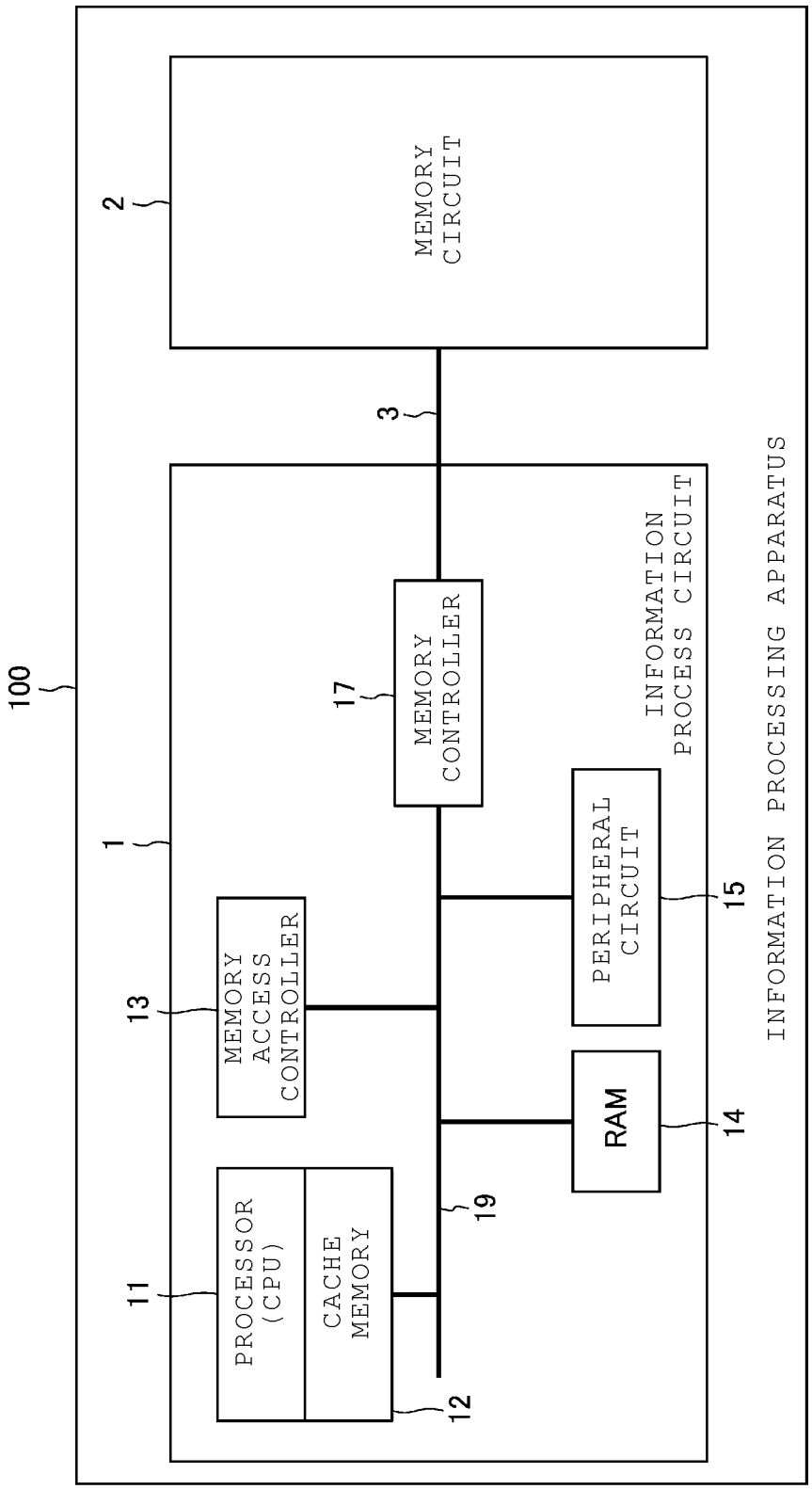
FIG. 1 depicts an information processing circuit of a first embodiment.

Embodiments provide a high-performance memory circuit.

In general, according to one embodiment, a memory circuit includes a plurality of nonvolatile memory cells, each of which loses stored data when read. A control circuit of the memory circuit is configured to receive a first instruction, then read data from a first memory cell designated by the first instruction but not rewrite the read data back to the first memory cell, and receive a second instruction, then read data from a second memory cell designated by the second instruction and rewrite the read data back to the second memory cell.

Certain example embodiments are described below with reference to the drawings. In the following description, components with substantially the same function and configuration are denoted by the same reference numerals, and repeated description of such aspects in different embodiments may be omitted. In order to distinguish particular components in a plurality of components having substantially the same function and configuration from each other, additional numbers or letters may be added to the end of the reference numeral.

Unless stated or otherwise explicitly excluded, aspects of different embodiments may be also applied to the other embodiments.

In general, each described functional block may be implemented by either hardware or computer software, or a combination thereof. Moreover, it is generally not essential for each described functional block to be distinguishable from each other as in the following example. For example, some functions described in the following as associated with one functional block may be executed by a different functional block different. Furthermore, the illustrated example functional block may be divided into finer functional sub-blocks or the like and/or the functions of multiple blocks may be combined into a single function block or the like.

Also, in general, the ordering of steps in the process flow of the methods of possible embodiments is not limited to the order of steps in the example embodiments, and unless stated otherwise, the described steps may be performed in an order different from the exemplified order and/or in combination with another step.

In the present specification and claims, the expression "connecting a first element to a second element" includes connecting the first element to the second element directly or via an element that is constantly or selectively conductive, such as switch element or a transistor.

The examples are described using an XYZ Cartesian coordinate system for convenience, but adoption of such coordinate system nomenclature and/or a fixed reference system is not necessarily a required aspect of the embodiments. In the following description, the term "below" and related or similar words in meaning refer to a position with a smaller coordinate on the z axis, and the term "above" and related or similar words refer to a position with a larger coordinate on the z axis.

1. First Embodiment

1.1. Configuration

1.1.1. Overall Configuration

FIG. 1 illustrates elements and connections in an information processing apparatus 100 of a first embodiment. The information processing apparatus 100 includes an information processing circuit 1 and a memory circuit 2. In some examples, the information processing apparatus 100 incorporate the information processing circuit 1 and the memory circuit 2 as separate semiconductor chips integrated together as an information processing system. In such a system, the information processing circuit 1 may be referred to as an information processing apparatus, and the memory circuit may be referred to as a memory device. In other examples, the information processing apparatus 100 may be implemented as a system-on-chip (SoC) device.

The information processing circuit 1 is connected to the memory circuit 2 via a memory bus 3. The information processing circuit 1 may be implemented, for example, as a system-on-chip (SoC). The information processing circuit 1 reads data stored in the memory circuit 2 and performs various processes by using the read data. The information processing circuit 1 writes data into the memory circuit 2. The information processing circuit 1 may be connected to an additional memory circuit (or memory device) such as a main memory or a primary storage device.

The information processing circuit 1 includes a processor 11, a cache memory 12, a memory access controller 13, a random access memory (RAM) 14, a peripheral circuit 15, and a memory controller 17. The cache memory 12, the memory access controller 13, the RAM 14, the peripheral circuit 15, and the memory controller 17 are communicably connected to each other, for example, via an internal bus 19. The processor 11 is connected to the cache memory 12. The processor 11 may be, for example, a central processing unit (CPU) or the like.

The RAM 14 temporarily stores data and can function as a buffer memory or a work area. The RAM 14 is, for example, a static RAM (SRAM). A program stored in the memory circuit 2 can be loaded into the RAM 14, the loaded program can be executed by the processor 11, and the information processing circuit 1 can execute various operations according to the program instructions. A program in this context can include various type of software including firmware and a compiler.

The peripheral circuit 15 may be any circuit that provides various functions associated with the operations of the memory circuit 2 and/or the information processing circuit 1. Specifically, in this example, the peripheral circuit 15 provides a function based intended operations of the information process circuit 1, such as, for example, the peripheral circuit 15 may be a display output circuit, a digital-to-analog conversion circuit, and/or a communication circuit.

The memory controller 17 is connected to the memory circuit 2 via the memory bus 3. The memory controller 17 accesses to the memory circuit 2 based on the instruction from another element in the information processing circuit 1. The memory controller 17 accesses to the memory circuit 2, for example, based on the instruction from the processor 11. The memory controller 17 reads data from the memory circuit 2 and writes data into the memory circuit 2 based on the received instruction.

The memory access controller 13 instructs the memory controller 17 to access the memory circuit 2. The memory controller 17 may autonomously access the memory circuit 2 in some instances without detailed instruction from the processor 11. That is, the memory access controller 13 receives an instruction from the processor 11 and transmits an instruction to the memory controller 17 so as to perform instructed data reading. The processor 11 can designate an address (transmission destination) in the information processing circuit 1 for the data to be read utilizing the memory access controller 13. The possible, non-limiting examples types of a memory access controller 13 includes a direct memory access controller (DMAC) and a hardware engine.

The memory circuit 2 can function as an extension of a main memory or primary storage of the information processing apparatus 100 and/or can function as a local storage of the information processing circuit 1.

1.1.2. Configuration of Memory Circuit

Figure 2:
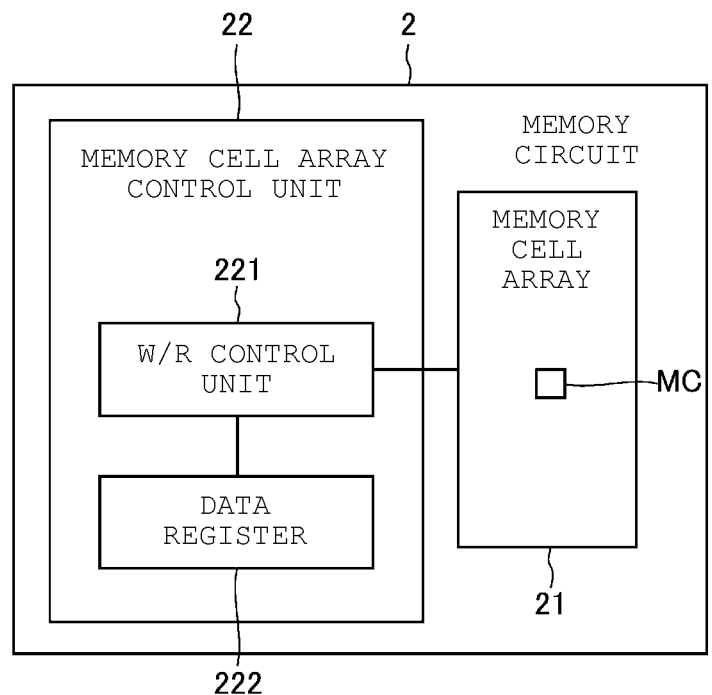
FIG. 2 depicts a memory circuit of a first embodiment.

FIG. 2 illustrates elements and connections in the memory circuit 2 of the first embodiment. The memory circuit 2 includes a memory cell array 21 and a memory cell array control unit 22.

The memory cell array 21 stores data in a non-volatile manner and thus includes a plurality of nonvolatile a memory cells MC. The memory cells MC store data. The memory cell array control unit 22 receives commands, address information, and write data from the outside of the memory circuit 2 and controls the memory cell array 21 based on the command and the address information. The memory cell array control unit 22 includes a write and read control unit (W/R control unit) 221 and a data register 222. The W/R control unit 221 receives commands, address information, write data (in this context, write data is the data to be written to the memory cell array 21) and writes the write data into one or the plurality of memory cells MC in the memory cell array 21 based on the command and the address information. The W/R control unit 221 also reads data from designated memory cells MC.

The memory circuit 2 is a so-called destructive read type memory circuit. That is, when the memory circuit 2 reads the stored data from a memory cell MC, the stored data of the memory cell MC thus read is lost from the memory cell MC itself (after a reading of a memory cell MC, the memory cell MC no longer stores useable data). Therefore, when the read data is required to remain stored in the memory circuit 2 after a reading, data which is the same as the just read data must be written back to the memory cells MC again. The writing of the lost read data is referred to as write-back, a write-back process, or writing back.

In general, the memory circuit 2 may be a memory circuit of any type that stores data so long as the memory circuit is a destructive read type of memory circuit. Examples of memory circuit types with a destructive read include a magnetoresistive RAM (MRAM) type and a ferroelectric RAM (FeRAM) type.

A MRAM memory cell includes an element that exhibits a magnetoresistive effect. The element that exhibits a magnetoresistive effect includes two ferromagnets and an insulator therebetween. If the magnetization direction of one ferromagnet is parallel to the magnetization direction of the other ferromagnet, the magnetoresistive effect element has certain first resistance value. If the magnetization direction of one ferromagnet is antiparallel to the magnetization direction of the other ferromagnet, the magnetoresistive effect element includes a second resistance value higher than the first resistance value. Such differences in resistance value correspond to different stored data values.

A FeRAM memory cell includes two polar plates and a capacitor including a ferroelectric substance therebetween. The FeRAM memory cell can store data based on the (positive or negative) polarity of the spontaneous polarization of the ferroelectric substance. For example, when the polarity of a charge stored in the ferroelectric substance has a certain first orientation (for example, positive polarity), the ferroelectric substance capacitor includes positive spontaneous polarization. If the polarity of a charge stored in the ferroelectric substance has a second orientation (negative polarity) opposite to the first orientation, the ferroelectric substance capacitor has negative spontaneous polarization. Such differences in polarization/orientation correspond to different stored data values.

As described above, the memory circuit 2 is connected to the information processing circuit 1 by the memory bus 3. Details of the memory bus 3 depend on the interface format for the memory circuit 2 and the interface format for the memory circuit 2 depends on what type of the memory circuit the memory circuit 2 is. However, in general, regardless of the type of the memory circuit 2, the memory bus 3 includes at least a command line CM or the equivalent. The command line CM transmits a command. In addition to commands, the command line CM may be used for transmission of address information and/or data. The memory bus 3 in this example further includes a signal line (or lines) based on the format of the memory bus 3 and the type of the memory circuit 2. Examples of signal lines include an address information line AD and a data line DQ. The address information line AD transmits the address information. The data line DQ transmits data. The number of separate signal lines or otherwise included in the memory bus 3 is not particularly limited.

Figure 3:
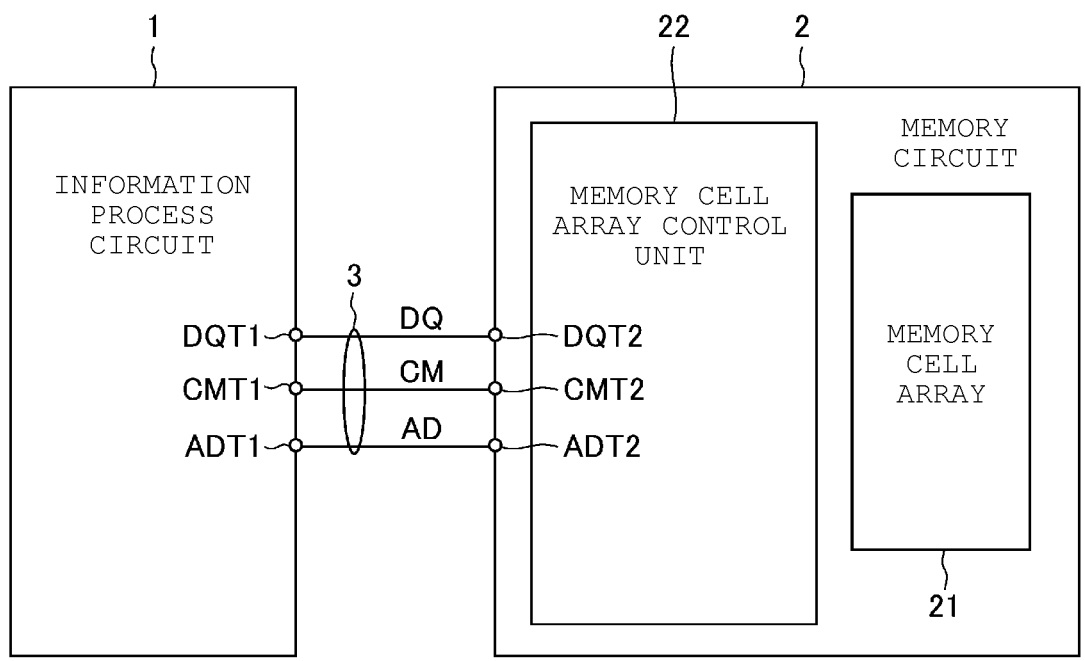
FIG. 3 depicts a memory bus and associated aspects of a first embodiment.

FIG. 3 illustrates an example of the memory bus 3 of the first embodiment and associated elements thereof. As described above, the particular details of the memory bus 3 depend on what type of the memory circuit the memory circuit 2 is. As described above, the memory bus 3 includes at least a command line CM. As such, the information processing circuit 1 includes a terminal CMT1 and the memory circuit 2 includes a terminal CMT2. The terminals CMT1 and CMT2 are connected to each other via the command line CM.

When memory bus 3 includes an address information line AD and a data line DQ, the information processing circuit 1 includes a terminal ADT1 and a terminal DQT1, and the memory circuit 2 includes a terminal ADT2 and a terminal DQT2. The terminals ADT1 and ADT2 are connected to each other via the address information line AD. The terminals DQT1 and DQ2 are connected to each other via the data line DQ.

Figure 4:
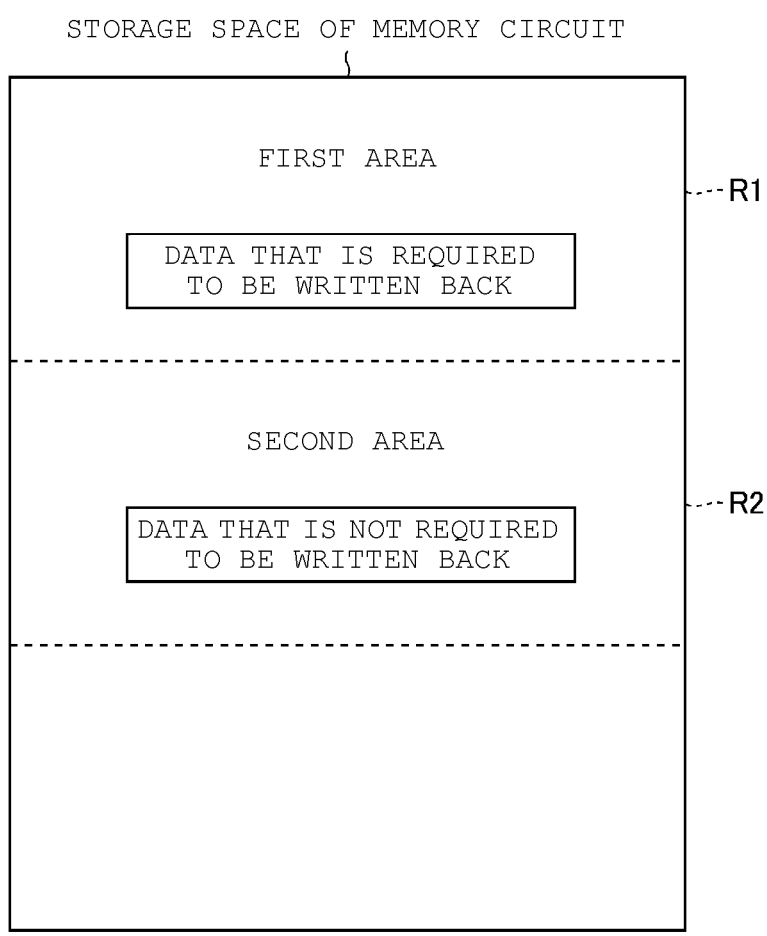
FIG. 4 depicts a storage space provided by a memory circuit of a first embodiment.

FIG. 4 illustrates an example of a storage space provided by the memory circuit 2 of the first embodiment. As illustrated in FIG. 4, the storage space includes at least a first area R1 and a second area R2. The first area R1 and the second area R2 can be identified by addresses (e.g., address ranges). The first area R1 and the second area R2 can be used for different applications or programs. In this example, first area R1 stores data that is required to be written back. The second area R2 stores data which is not required to be written back. The data stored in the first area R1 and the second area R2 may be stored in advance and/or may be stored by the writing instructed by the information processing circuit 1.

The plurality of portions included in the first area R1 of the storage space may have consecutive addresses or may have discrete addresses. The plurality of portions included in the second area R2 of the storage space may have consecutive addresses or may have discrete addresses. An address of one portion of the second area R2 may be positioned between respective addresses of two portions of the first area R1. In the same manner, an address of one portion of the first area R1 may be positioned between respective addresses of the two portions of the second area R2.

1.2. Operation

1.2.1. Data Writing

Figure 5:
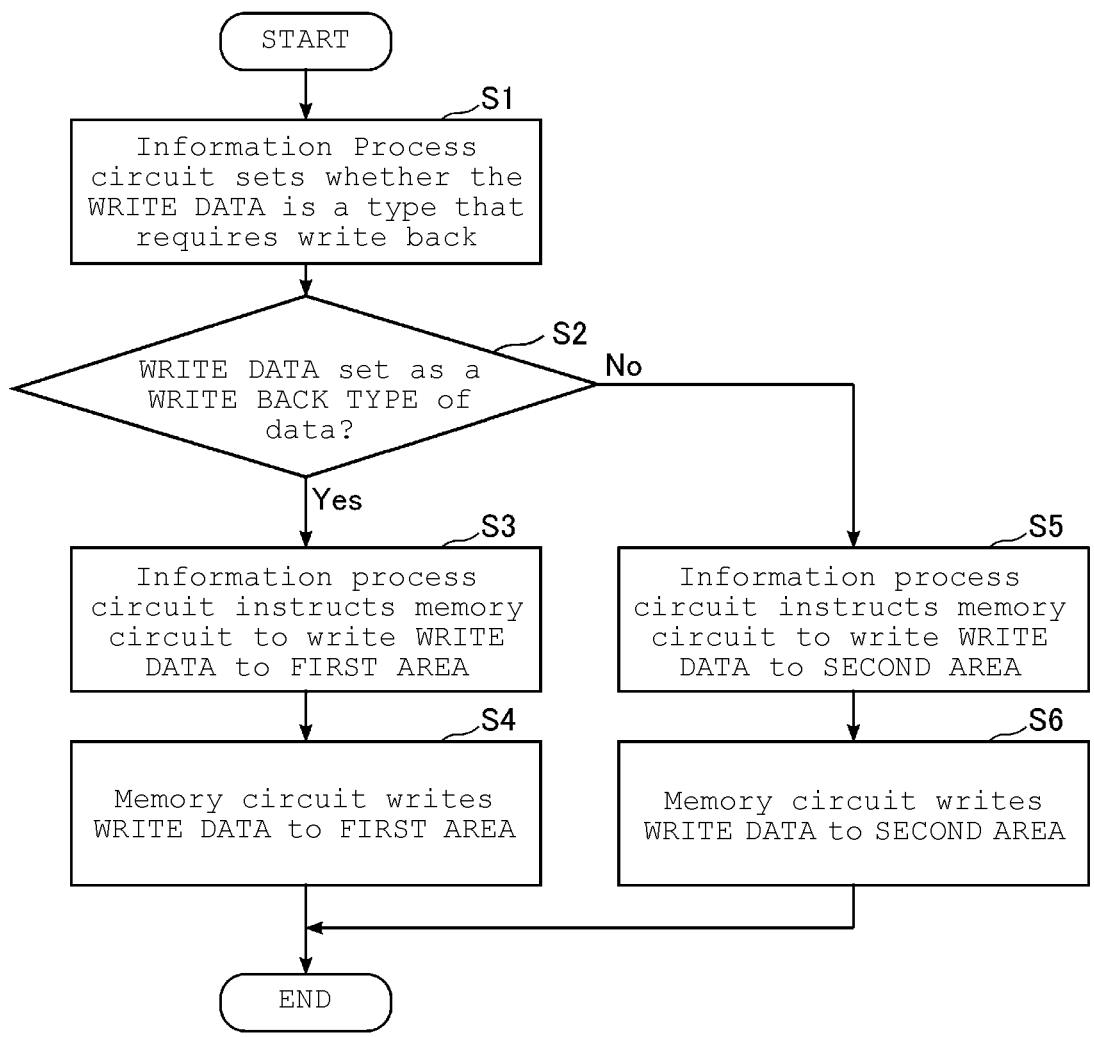
FIG. 5 illustrates a process flow of data writing in an information processing apparatus of a first embodiment.

FIG. 5 illustrates a flow of data writing in the information processing apparatus 100 of the first embodiment. As illustrated in FIG. 5, particularly when the processor 11 writes a certain kind of data to the memory circuit 2, it can be determined whether the data to be written (write data) is of a type required to be written back if later read from the memory circuit 2 (Step S1). The processor 11 can determine the necessity of the write-back, for example, based on the attributes and/or properties of the write data. The processor 11 can, for example, cause data for which it cannot be specifically determined whether writing back is required to be treated as data required to be written back in order to maintain mutual consistency of the data.

When the write data is of a type required to be written back (Yes in Step S2), the information processing circuit 1 causes the memory controller 17 to instruct the memory circuit 2 to write the data to the first area R1 in the storage space of the memory circuit 2 when the data is of type that is required to be written back (Step S3). The data writing instruction includes transmission of a write command, address information for the write destination, and the write data to the memory circuit 2. Once the data writing instruction is received, the memory circuit 2, more particularly the W/R control unit 221, executes the instructed data writing (Step S4).

However, when the write data is not of a type required to be written back (No in Step S2), the information processing circuit 1 causes the memory controller 17 to instruct the memory circuit 2 to write the data to the second area R2 in the storage space of the memory circuit 2 (Step S5). Once the data writing instruction is received, the memory circuit 2 executes the instructed data writing (Step S6).

1.2.2. Data Reading

Figure 6:
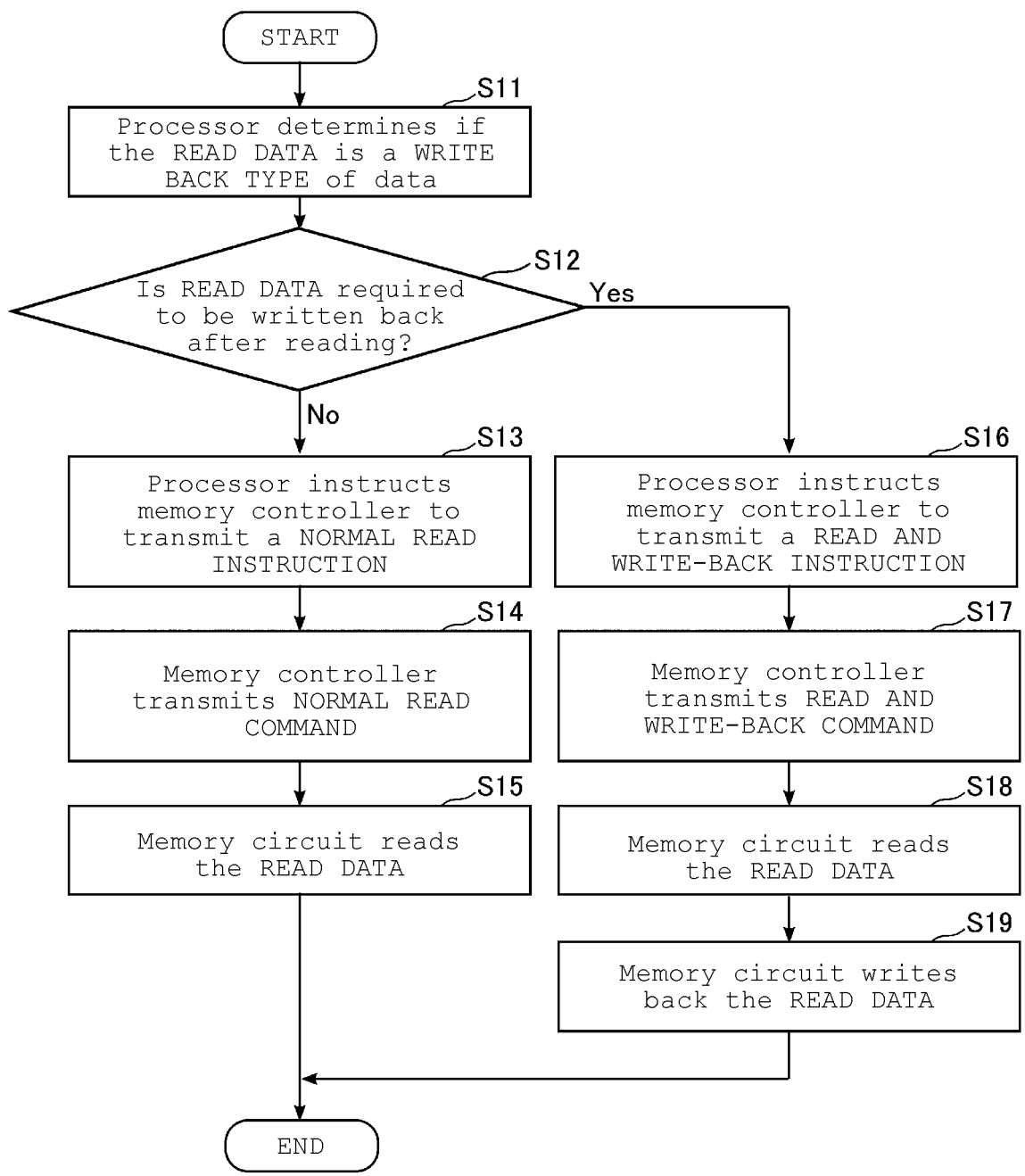
FIG. 6 illustrates a process flow of data reading in an information processing apparatus of a first embodiment.

FIG. 6 illustrates a flow of data reading in the information processing apparatus 100 of the first embodiment. If the information processing circuit 1 determines to read certain data from the memory circuit 2, the flow of data reading of FIG. 6 is started.

The processor 11 determines whether the data to be read is data that is required to be written back (Step S11). The determination can be performed based on the address in the memory circuit 2 where the data to be read is stored (reading target).

When it is not required for the data to be written back (No in Step S12), the processor 11 instructs the memory controller 17 to transmit an instruction for a normal data reading of the reading target (that is, a normal read instruction is transmitted) (Step S13). Once the instruction is received, the memory controller 17 instructs a normal data reading of the reading target by the memory circuit 2 (Step S14). The normal data reading instruction includes transmission of a normal data read command (normal read command) and information corresponding to an address location of the reading target. The normal read command does not include instruction for write-back. When the normal read instruction is received, the memory circuit 2 reads data from the reading target address(es) and then transmits the read data to the information processing circuit 1 (Step S15). once Step S15 is completed, the processing flow ends.

However, when it is required for the data being read to be written back (Yes in Step S12), the processor 11 instructs the transmission of an instruction for a data reading from the reading target along with a write-back instruction (this is, also referred to as a reading with write-back or read-write-back operation) to the memory controller 17 (Step S16). Once the instruction for a reading with write-back (a read-write-back instruction) is received, the memory controller 17 instructs the memory circuit 2 to read data from the reading target address (es) and then write the data back (Step S17). The read-write-back instruction includes transmission of one command instructing both the reading and writing back of the data (referred to as a read-write-back command) and address information of the reading target. When the read-write-back command is received, the memory circuit 2 reads data from the reading target, stores the read data in the data register 222, and transmits the read data to the information processing circuit 1 (Step S18). After this, the memory circuit 2 then writes the data stored in the data register 222 back to the reading target (Step S19). Once Step S19 is completed, the processing flow ends. In some examples, the write-back operation of Step S19 may be performed before the transmission of the read data to the information processing circuit 1 occurs in Step S18 or may be performed simultaneously with (in parallel with) the transmission. That is, after the data is read in the first part of the operations of Step S18, the write-back operation in Step S19 may be performed at anytime including in parallel with another operation, such as transmission of the read data to the information processing circuit 1.

FIG. 7 depicts a signal flow on the memory bus 3 of the first embodiment. Particularly, FIG. 7 illustrates examples of a signal transmitted on the command line CM from the information processing circuit 1 to the memory circuit 2 in order to read data from the memory circuit 2 in the first embodiment. FIG. 7 illustrates a normal reading (that is a reading without write-back) in the upper half of the figure and a reading with write-back (referred to as a "read-write-back" or a "read and write-back") in the lower half of the figure.

As illustrated in the upper half of FIG. 7, the normal read command is sent for a normal reading. However, as illustrated in the lower half of FIG. 7, a read-write-back command is sent for a reading with write-back. The read-write-back command is different from a normal read command.

1.3. Advantage (Effect)

According to the first embodiment, the information processing circuit 1 that can operate with a reduced data communication amount can be provided.

In a manner similar to the memory circuit 2, for a memory circuit with memory cells from which stored data is lost/removed in the reading process, a write-back to the memory circuit of the type for is often desired. In general, it can be considered that the read data (the data that has just been read) from such a memory circuit will be stored in a cache memory of the information processing circuit connected to the memory circuit. Thus, after the reading of the data from the memory circuit, the data stored in the cache memory (cached data) can be transmitted to the memory circuit and then written back. However, according to this technique, in order to reach the memory circuit from cache memory via the memory controller, the read data is required to flow back and forth on the internal bus of the information process circuit and utilize the bandwidth of the memory bus in each direction in quick succession. Such a back-and-forth flow of data presses the bandwidths of both the internal bus and the memory bus.

However, according to the first embodiment, when reading data required to be written back, the information process circuit 1 transmits a read-write-back command to the memory circuit 2 instead of just the standard read command. When the read-write-back command is received, the memory circuit 2 will writes back the read data stored in the data register 222 to the memory cells MC and also transmit the read data to the information process circuit 1. Therefore, the data to be written back (also referred to as "write-back data" in this context) is not required to be transmitted twice along the internal bus 19 and the memory bus 3 for the write-back operation. Therefore, the over utilization of the bandwidths of the internal bus 19 and the memory bus 3 can be prevented. Furthermore, in general, the power required to transmit the write-back data through the internal bus and the memory bus 3 is not consumed. Therefore, the consumption of the power can be reduced.

1.4. Modification Example

The description above relates to the example in which the determination regarding whether the data is required to be written back is performed based on the address where the data is stored. However, the first embodiment is not limited to this. For example, the processor 11 can determine the necessity of the write-back based on the properties and/or characteristics of the data to be read other than simply the address of the data to be read. That is, the processor 11 can determine whether the data to be read is required to be written back based on of the kind of data that is required to be read in the processing of the processor 11 or based on the particular processing of the processor 11 associated with the data read instruction.

The first embodiment is not limited to a specific form of the determination on whether the data to be read is required to be written back. The determination regarding whether the data to be read is required to be written back may be performed by any method.

2. Second Embodiment

A second embodiment is different from the first embodiment with regard to the determination as to whether to execute a normal read or a reading with write-back. The other aspects of the second embodiment are the same as those of the first embodiment. The difference of the configuration and the operation of the second embodiment from the first embodiment is mainly described in the following.

2.1. Configuration

Figure 8:
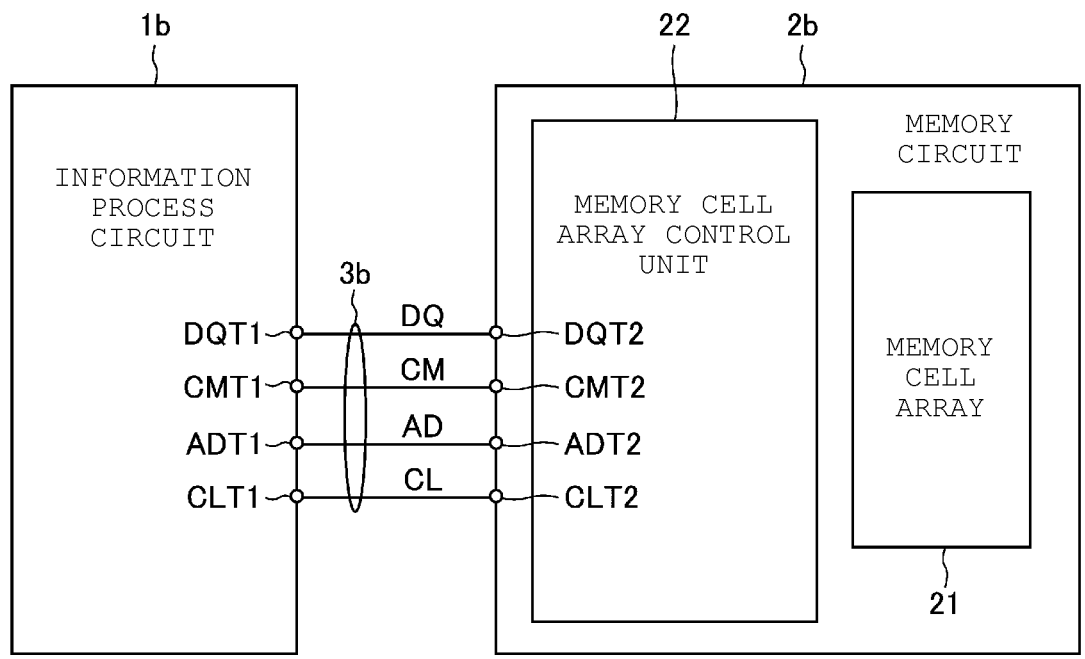
FIG. 8 depicts a memory circuit of a second embodiment and associated aspects thereof.

FIG. 8 illustrates elements of the memory circuit 2 of the second embodiment and associated elements thereof. The memory bus 3 of the second embodiment is different from the memory bus 3 of the first embodiment. Hereinafter, in order to distinguish the memory bus 3 of the first embodiment, the memory bus 3 of the second embodiment may be referred to as a memory bus 3b.

The memory bus 3b includes a control signal line CL in addition to the command line CM, the address information line AD, and the data line DQ included in the memory bus 3. The information processing circuit 1 and the memory circuit 2 of the second embodiment are connected to each other via the memory bus 3*b* and can transmit and receive the signal transmitted via the memory bus 3*b*. The information processing circuit 1 and the memory circuit 2 of this second embodiment may be referred to as an information processing circuit 1*b* and a memory circuit 2*b* to be distinguished from the information processing circuit 1 and the memory circuit 2 of the first embodiment.

The information processing circuit 1*b* includes a terminal CLT1, the memory circuit 2*b* includes a terminal CLT2, and the terminals CLT1 and CLT2 are connected to the control signal line CL.

Figure 9:
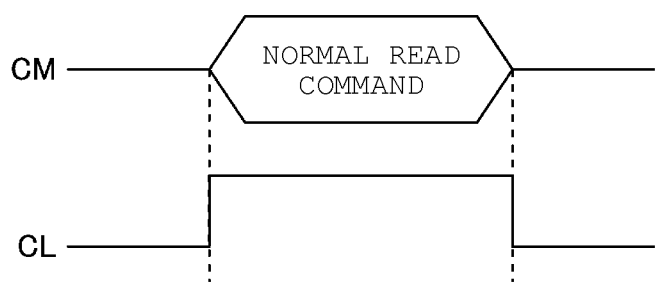
FIG. 9 depicts aspects of a signal flow on a memory bus of a second embodiment.

The control signal line CL transmits a control signal. The control signal transmits digital information indicating whether the data to be read that has been designated by the address information by the data read instruction associated with the control signal is required to be written back. The information provided by the control signal is referred to as write-back necessity information. The write-back necessity information has a first logic value (for example, an "H" level) when write-back is required. The write-back necessity information has a second logic value (for example, an "L" level) when write-back is not required. For example, as illustrated in FIG. 9, the read instruction that can be associated with the write-back necessity information is a normal read command sent in parallel with the write-back necessity information.

2.2. Operation

The data writing is the same as that of the first embodiment.

Figure 10:
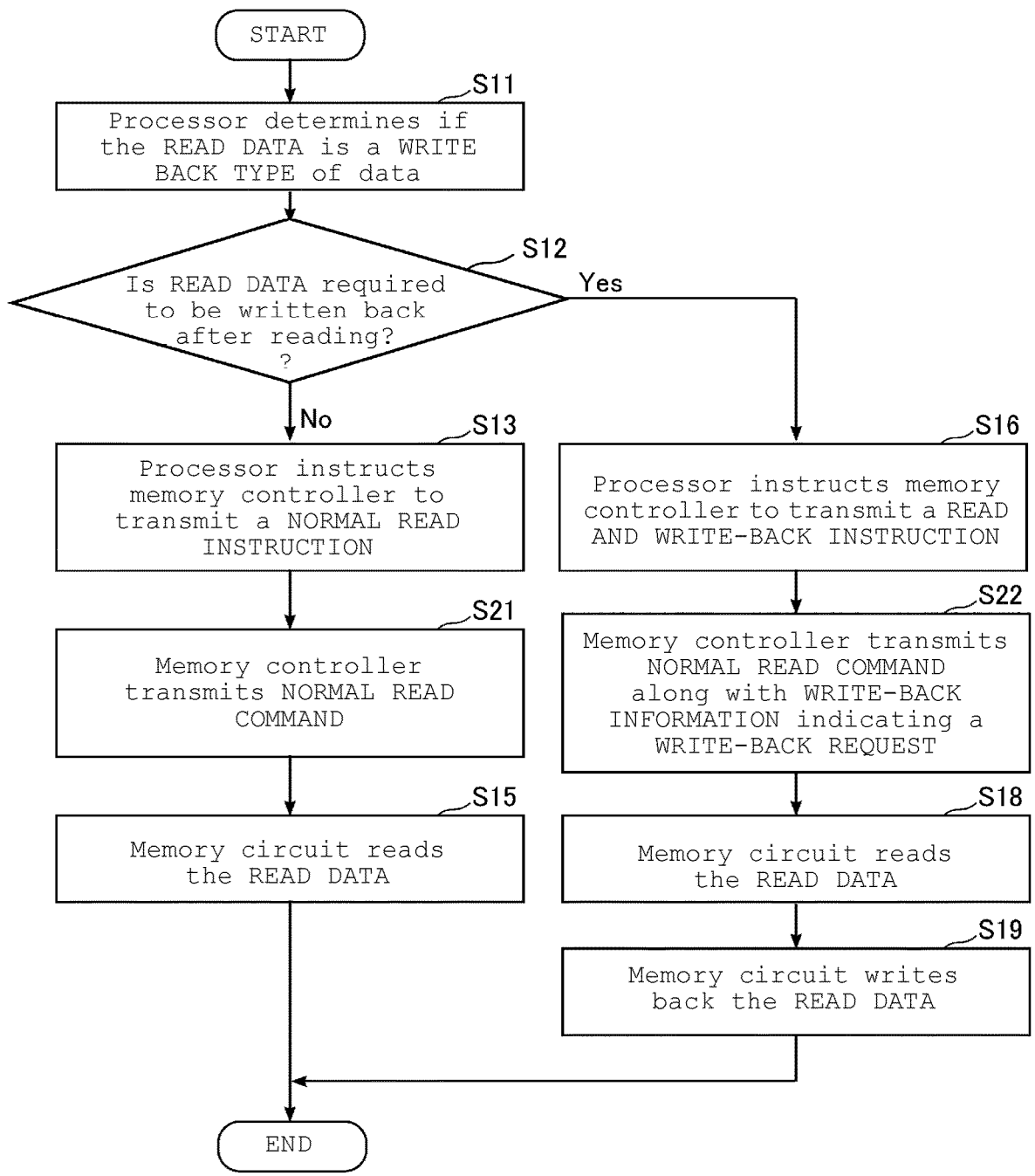
FIG. 10 illustrates a process flow of data reading in an information processing apparatus of a second embodiment.

FIG. 10 illustrates a flow of data reading in the information processing apparatus 100 of the second embodiment.

First, in Step S11, the necessity of the write-back is determined. When the write-back is not required, the flow proceeds from Step S13 to Step S21. In Step S21, the memory controller 17 instructs the memory circuit 2 for normal reading from the reading target. The normal read instruction includes the transmission of a normal read command and address information of the reading target as described with reference to Step S14 of FIG. 6 according to the first embodiment. However, the normal read instruction includes write-back necessity information indicating that write-back is not required. Step S21 proceeds to Step S15. In Step S15, the normal reading is performed.

However, when the written back is required, the flow proceeds from Step S16 to Step S22. In Step S22, the memory controller 17 instructs the memory circuit 2 for reading with write-back. The read and write-back instruction includes transmission of the normal read command, the address information of the reading target, and the write-back necessity information indicating that a write-back is required. Step S22 proceeds to Step S18. In Steps S18 and S19, reading with write-back is performed.

2.3. Advantage

The information processing circuit 1*b* of the second embodiment can transmit the write-back necessity information, and the memory circuit 2*b* of the second embodiment can recognize the write-back necessity information. The information processing circuit 1*b* designates the normal reading or reading with write-back in a similar manner as in the first embodiment by using the write-back necessity information. Therefore, the same advantage as the first embodiment can be obtained.

3. Third Embodiment

The third embodiment differs from the first embodiment regarding the determination as whether to execute a normal read or with a read-write-back. The other aspects of the third embodiment are substantially the same as those of the first embodiment. Hereinafter, differences between the third embodiment and the first embodiment is mainly described.

3.1. Configuration

Figure 11:
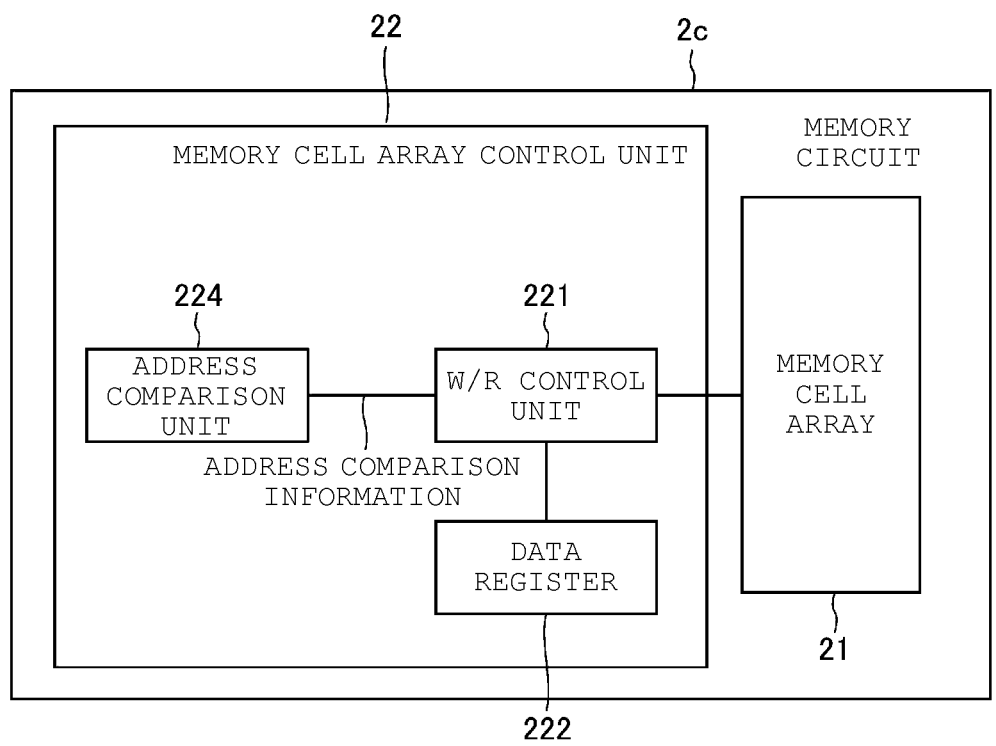
FIG. 11 depicts a memory circuit according to a third embodiment.

FIG. 11 illustrates elements and connections in the memory circuit 2 according to the third embodiment. Hereinafter, the memory circuit 2 of the third embodiment is referred to as a memory circuit 2*c* to be distinguished from the memory circuit 2 of the first embodiment.

As illustrated in FIG. 11, the memory circuit 2*c* includes an address comparison unit 224 in the memory cell array control unit 22. The address comparison unit 224 receives the reading target address information included in a normal read instruction and then determines whether the reading target designated by the reading target address information is included in a plurality of addresses a first area R1 (see FIG. 4) of the storage space of the memory circuit 2. When the reading target is included in the first area R1, the address comparison unit 224 transmits address comparison information to the W/R control unit 221 indicating that the reading target is in the first area R1. For example, the transmission of the address comparison information can be performed by transmitting an internal signal separate from the reading target address information along with the reading target address information. For example, the address comparison information is transmitted to the address comparison unit 224 in parallel with the reading target address information.

The first area R1 to the address comparison unit 224 may be set by any method. For example, the first area R1 is set in advance and is fixed. Otherwise, the first area R1 may be dynamically set. For example, after the start-up of the information processing circuit 1 before the writing of the first data to the memory circuit 2*c*, the information processing circuit 1 (particularly, the processor 11) transmits the command and the address information on the memory bus 3 and notifies the address comparison unit 224 of the address for specifying the first area R1. The address comparison unit 224 sets a portion specified by the notified address in the storage space of the memory circuit 2*c* as the first area R1. Otherwise, the information processing circuit 1 may notify the address comparison unit 224 of the address for specifying the first area R1 at any timing.

If address comparison information indicating that the reading target is included in the first area R1 is received, the W/R control unit 221 recognizes that the data to be read is required to be written back after the reading.

3.2. Operation

The data writing is the same as that in the first embodiment.

Figure 12:
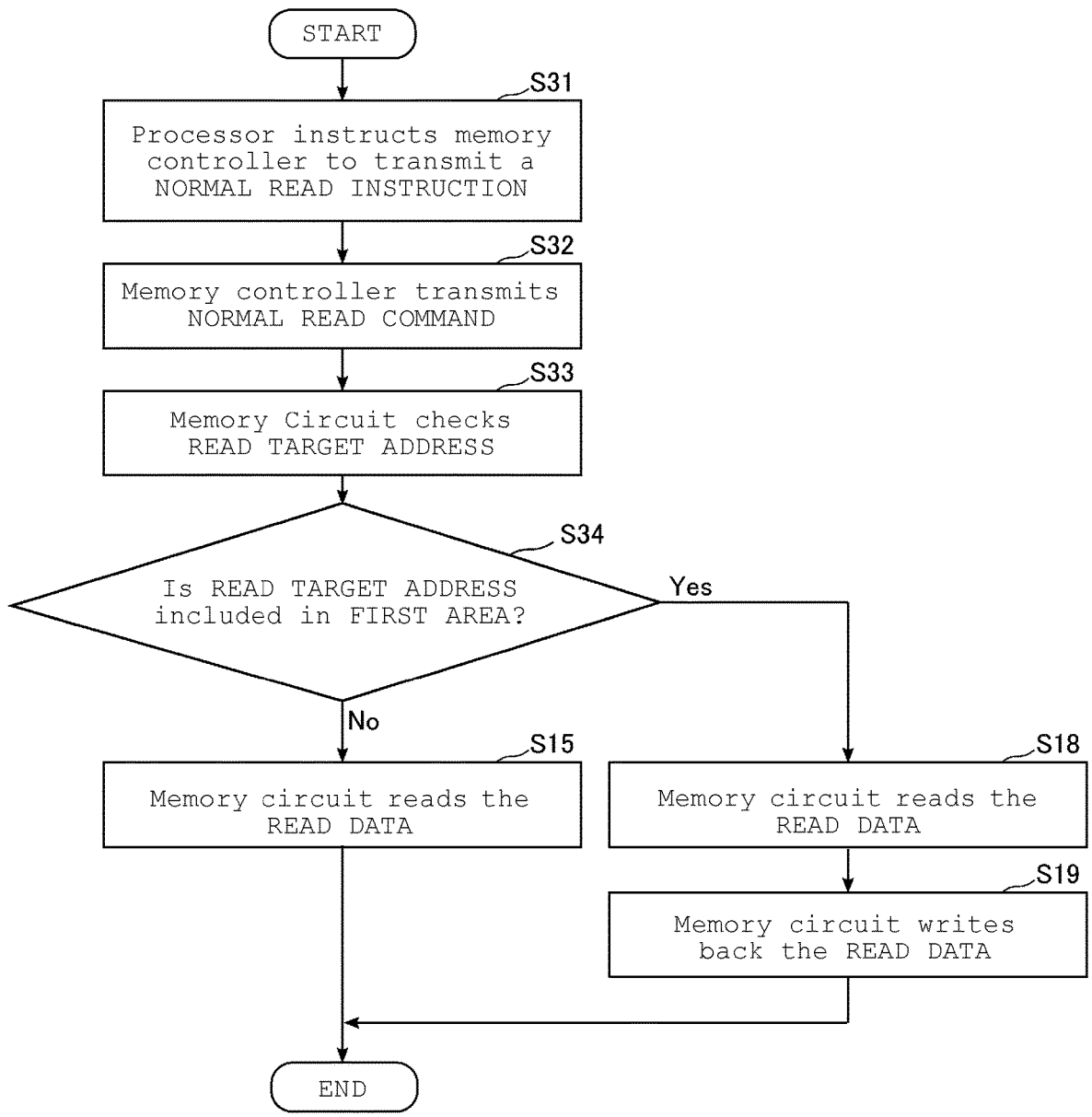
FIG. 12 illustrates a process flow of data reading in an information processing apparatus of a third embodiment.

FIG. 12 illustrates a flow of data reading in the information processing apparatus 100 of the third embodiment. If the information processing circuit 1 determines to read a certain kind of data from the memory circuit 2, the flow of data reading of FIG. 12 is started.

The processor 11 instructs the memory controller 17 for the transmission of the normal read instruction (Step S31). Step S31 is the same as the instruction of transmitting a normal read instruction described with reference to Step S13. Subsequently, the memory controller 17 transmits the normal read instruction to the memory circuit 2 (Step S32). Step S32 is the same as the transmission of the normal read instruction described with reference to Step S14.

Once the normal read instruction is received, the memory circuit 2 determines whether the reading target is included in the plurality of addresses of the first area R1 in the storage space of the memory circuit 2 (Step S33). When the reading target is not included in the addresses of the first area R1 (No in Step S34), the memory circuit 2 reads the data from the reading target in Step S15 and transmits the read data to the information processing circuit 1. Once Step S15 is completed, the processing flow ends.

However, when the reading target is included in first area R1 (Yes in Step S34), the memory circuit 2 reads the data from the reading target in Step S18, stores the read data in the data register 222, and transmits the read data to the information processing circuit 1. The memory circuit 2 then writes the data stored in the data register 222 back to the reading target in Step S19. Once Step S19 is completed, the processing flow ends. In some examples, the write-back of Step S19 may be performed before the transmission of the read data to the information processing circuit 1 in Step S18.

The memory circuit 2c of the third embodiment determines whether the read data is required to be written back based on the reading target address or the like. That is, the memory circuit 2c recognizes the read data must be written back when the reading target is in the plurality of addresses specifying the first area R1 of the storage space of the memory circuit 2. Thus, if the read data is required to be written back (based on its initial location), the read data will be written back after the reading. When the reading target is not located in the first area R1, the memory circuit 2 does not write back the data after reading. In this manner, the memory circuit 2 can identify the necessity of a write-back based on the reading target location. Therefore, substantially the same advantages as the first embodiment can be obtained.

4. Fourth Embodiment

The fourth embodiment relates to a case of reading data from the memory circuit 2 via the memory access controller 13. The fourth embodiment can be performed in combination with the first embodiment, the second embodiment, or the third embodiment.

4.1. Configuration

The details of the configuration and the operation of the fourth embodiment are different based on which of the first embodiment, the second embodiment, and the third embodiment, is being combined with the fourth embodiment. When being combined with the first embodiment, the configuration of the information processing apparatus 100 of the fourth embodiment is the same as the configuration of the information processing apparatus 100 of the first embodiment. When being combined with the second embodiment, the configuration of the information processing circuit 1 of the fourth embodiment is the same as the configuration of an information processing apparatus 100b of the second embodiment. When being combined with the third embodiment, the configuration of the information processing apparatus 100 of the fourth embodiment is the same as the configuration of the information processing apparatus 100 of the third embodiment. However, the processor 11 in the fourth embodiment is configured to perform the operation described below. Specifically, the firmware loaded onto the RAM 14 is configured to cause the processor 11 to perform the following operation when executed.

Figure 13:
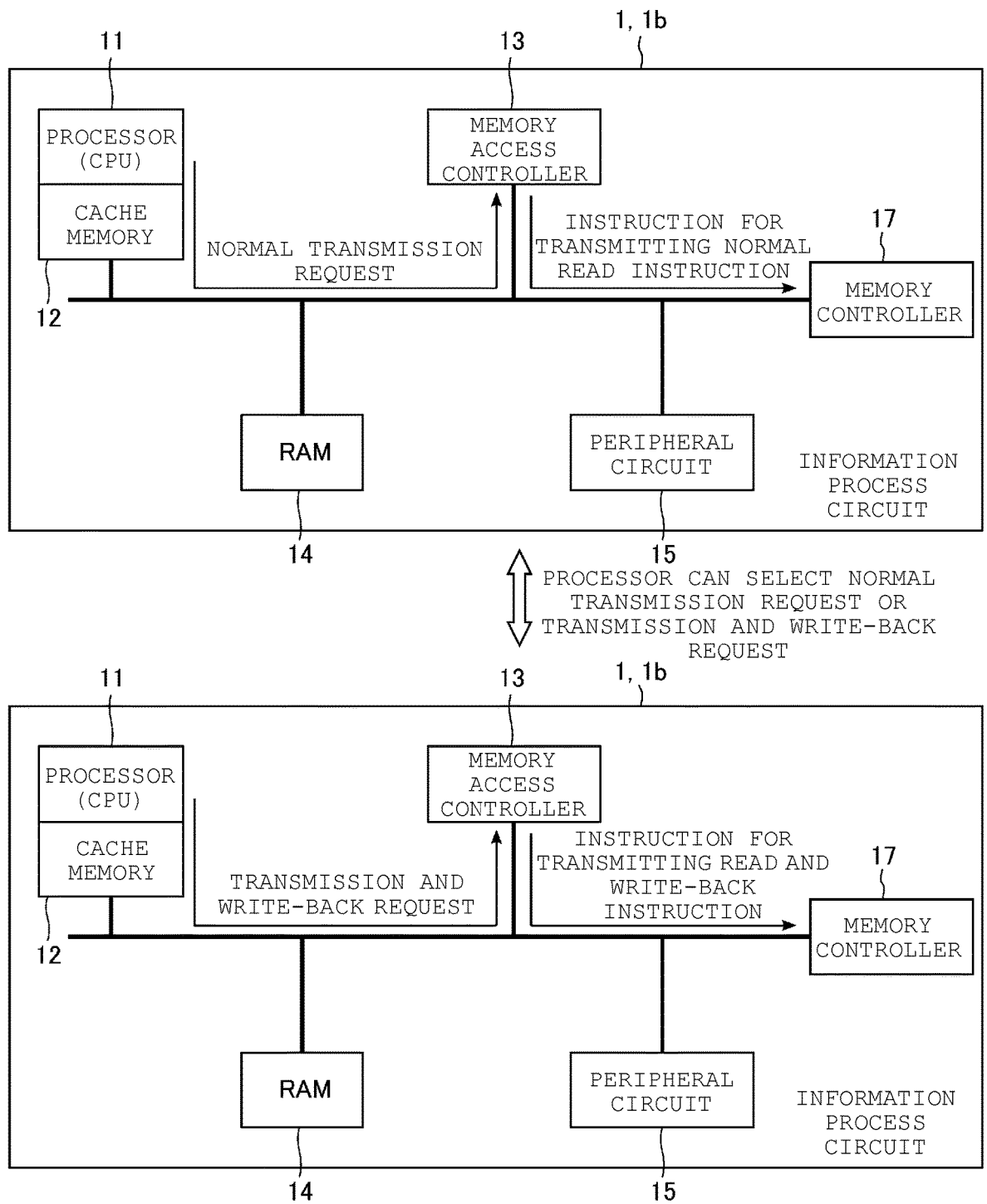
FIG. 13 illustrates an example of signals flow in an information processing circuit of a fourth embodiment.

FIG. 13 illustrates an example of a signal flow in the information processing circuit 1 of the fourth embodiment. As illustrated in FIG. 13, the processor 11 can transmit a request for transmission of data (a normal transmission request) from the memory circuit 2 to the memory access controller 13. Once the request is received, the memory access controller 13 instructs the memory controller 17 to transmit the read instruction to the memory circuit 2.

As illustrated in the upper portion of FIG. 13, the processor 11 can request a data transmission without write-back (as in a normal data transmission request) from the memory access controller 13. As illustrated in the lower portion of FIG. 13, the processor 11 can also request a data transmission with write-back (hereinafter, also referred to as transmission with write-back) from the memory access controller 13. If the transmission with write-back is requested, the memory access controller 13 instructs the memory controller 17 to transmit the read-write-back instruction for the reading target. Once the instruction is received, the memory controller 17 instructs the memory circuit 2 to perform the instructed reading with write-back.

4.2. Operation

The data writing is the same as the first embodiment.

4.2.1. Combination with First Embodiment

Figure 14:
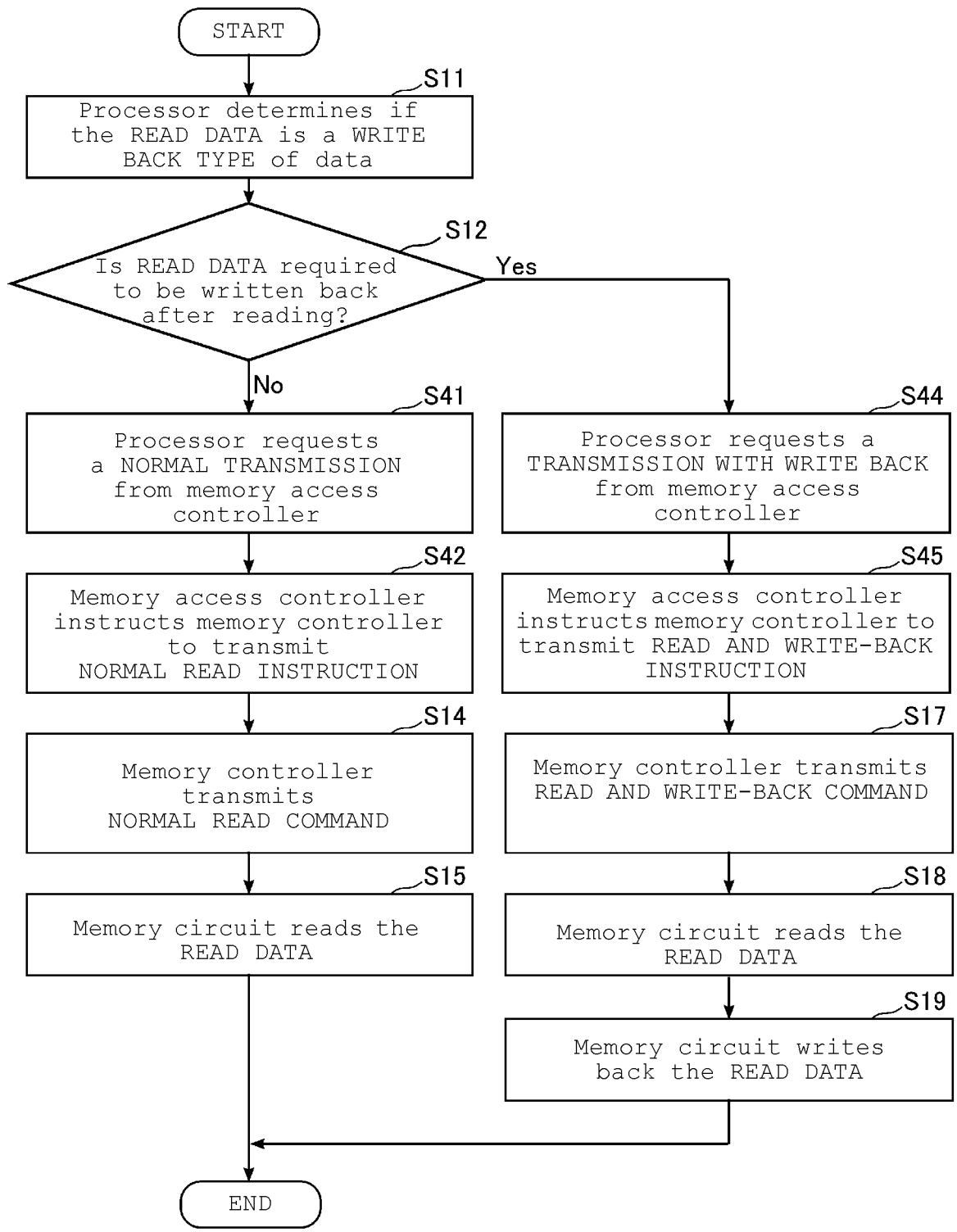
FIG. 14 illustrates a process flow of data reading of a first example type in an information processing apparatus of a fourth embodiment.

FIG. 14 illustrates a flow of data reading of a first example in the information processing apparatus 100 of the fourth embodiment and illustrates a case where the fourth embodiment is combined with the first embodiment. If the information processing circuit 1 determines to transmit a certain kind of data from the memory circuit 2 to the information processing circuit 1 by using the memory access controller 13, the flow of data reading of FIG. 14 is started.

First, in Step S11, the necessity of write-back is determined. When the write-back is not required (No in Step S12), the processor 11 requests a normal data transmission from the reading target from the memory access controller 13 (Step S41).

Once the request is received, the memory access controller 13 instructs the memory controller 17 to transmit an instruction for a normal reading from the reading target (Step S42). Step S42 proceeds to Step S14. In Steps S14 and S15, a normal reading is performed.

However, when write-back is required (Yes in Step S12), the processor 11 requests data transmission with write-back from the reading target from the memory access controller 13 (Step S44).

Once the request is received, the memory access controller 13 instructs the memory controller 17 to transmit the read and write-back instruction for the reading target (Step S45). Step S45 proceeds to Step S17. In Steps S17, S18, and S19, a reading with write-back is performed.

4.2.2. Combination with Second Embodiment

Figure 15:
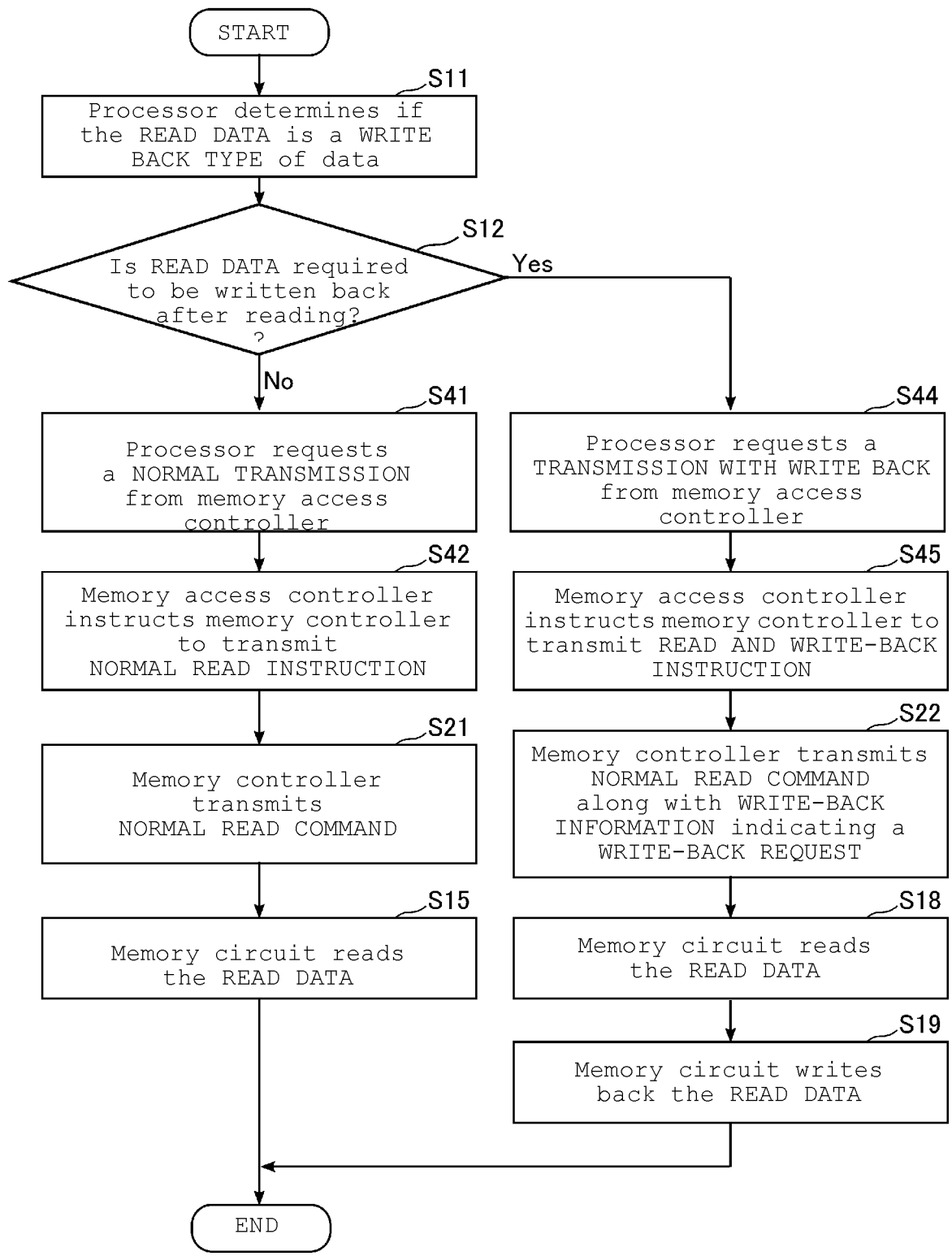
FIG. 15 illustrates a process flow of data reading of a second example type in an information processing apparatus of a fourth embodiment.

FIG. 15 illustrates a flow of data reading of a second example in the information processing apparatus 100 of the fourth embodiment and illustrates a case where the fourth embodiment is combined with the second embodiment. If the information processing circuit 1 determines to transmit a certain kind of data from the memory circuit 2 to the information processing circuit 1 by using the memory access controller 13, the flow of data reading of FIG. 15 is started.

First, in the process flow of FIG. 14, the necessity of write-back is determined in Step S11, the normal transmission request and the normal read instruction are transmitted in Steps S41 and S42, or the transmission and write-back request and the read and write-back instruction are transmitted in Steps S44 and S45, Step S42 proceeds to Step S21, or Step S45 proceeds to Step S22. That is, the memory controller 17 instructs the memory circuit 2 for a normal reading or a reading with write-back by using the write-back necessity information as in the second embodiment.

4.2.3. Combination with Third Embodiment

Figure 16:
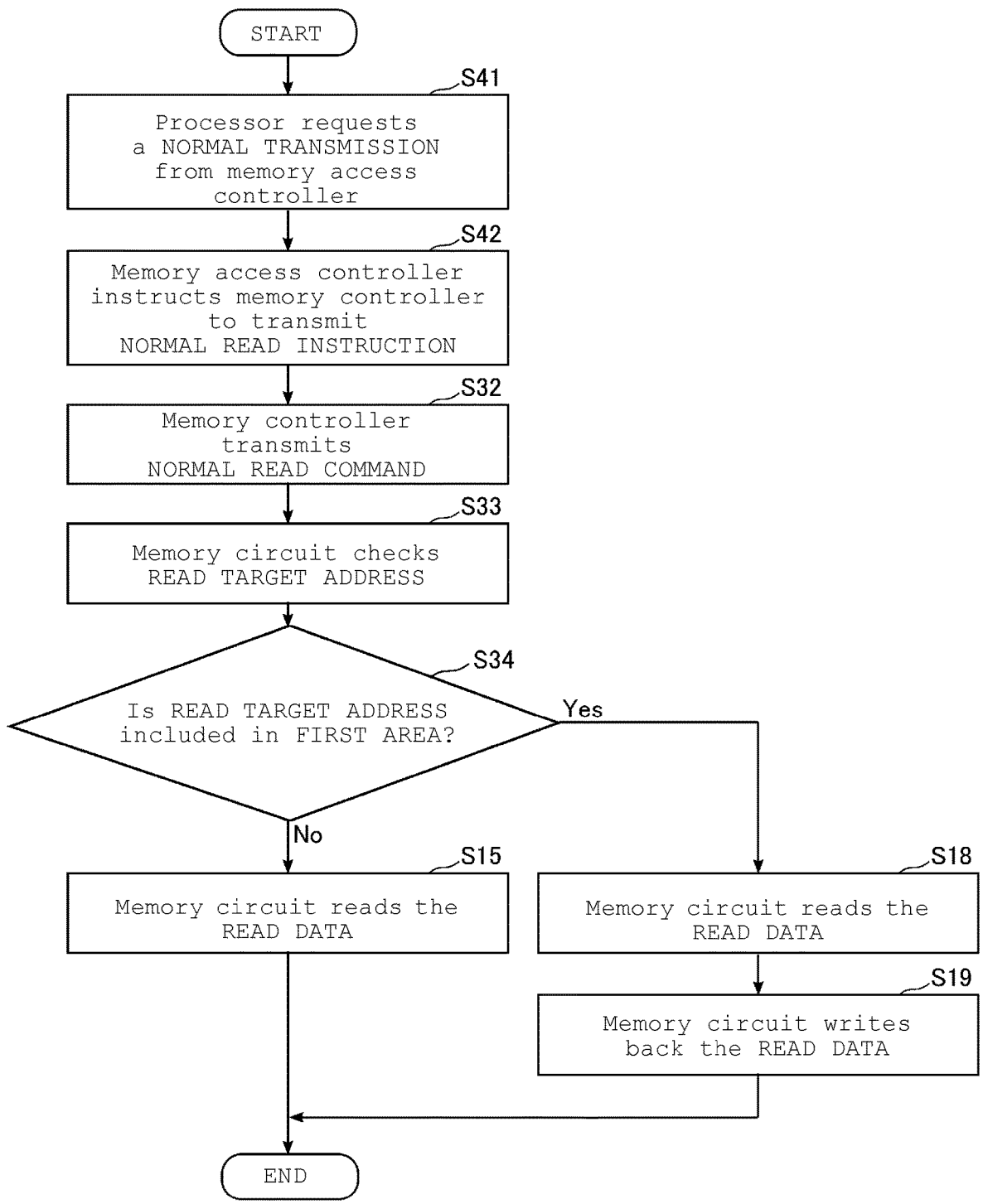
FIG. 16 illustrates a process flow of data reading of a third example type in an information processing apparatus of a fourth embodiment.

FIG. 16 illustrates a process flow of data reading of a third example in the information processing apparatus 100 of the fourth embodiment and illustrates a case where the fourth embodiment is combined with the third embodiment. If the information processing circuit 1 determines to transmit a certain kind of data from the memory circuit 2 to the information processing circuit 1, the process flow of data reading of FIG. 16 is started.

First, in Steps S41 and S42, the normal transmission request and the normal read instruction are transmitted. Subsequently, in Step S32, the normal read instruction is transmitted. The Steps subsequent to Step S32 are the same as those in FIG. 12 of the third embodiment.

4.3. Advantage

According to the fourth embodiment, the processor 11 can provide specific requests to the memory access controller 13 for data transmission from the memory circuit 2, and the memory access controller 13 can reads data from the memory circuit 2 based on the requests from the processor 11. The processor 11 transmits the data transmission request to the memory access controller 13 together with information indicating whether or not write-back is necessary. The memory access controller 13 instructs the memory circuit 2 for a normal reading or a reading with write-back in the same manner as in the first embodiment or the second embodiment based on the specification provided by the processor 11. Therefore, even when the memory access controller 13 accesses the memory circuit 2, the same advantage as in the combination of the first, second, and the third embodiments with the fourth embodiment can be acquired.

4.4. Modification Example

The fourth embodiment is not limited to the transmission of a data read instruction to the memory circuit 2 from the memory access controller 13. The fourth embodiment may be applied to any element with a function of instructing or controlling the memory circuit 2 for the data reading similar to the memory access controller 13.

In the fourth embodiment, whether various possible control elements including the memory access controller 13 itself acting autonomously or the like may require data to be written back based on that the various functions or operations of the possible control elements (including the memory access controller 13) that may transmit or generate data read or write instructions for the memory circuit 2. That is, for example, the processor 11 may request the memory access controller 13 to autonomously write data in Step S1 of FIG. 5 of the first embodiment. The memory access controller 13 determines the necessity of write-back based on the attributes and/or properties of the data requested to be written. The memory access controller 13 instructs the memory circuit 2, via the memory controller 17, to write the data that has been determined or designated as requiring write-back to the first area R1 in the storage space of the memory circuit 2 in Step S3. Otherwise, in Step S5, the memory access controller 13 instructs the memory circuit 2, via the memory controller 17, to write data which has been determined or designated as not requiring write-back to the second area R2 in the storage space of the memory circuit 2.

5. Fifth Embodiment

A fifth embodiment relates to a case of data reading from the memory circuit 2 via the memory access controller 13 as in the fourth embodiment. However, the fifth embodiment is different from the fourth embodiment according to the determination as to whether to execute a normal read or a reading with write-back. Hereinafter, among the configuration and the operation of the fifth embodiment, the differences of the configuration from the first embodiment are mainly described.

5.1. First Example

5.1.1. Configuration

Figure 17:
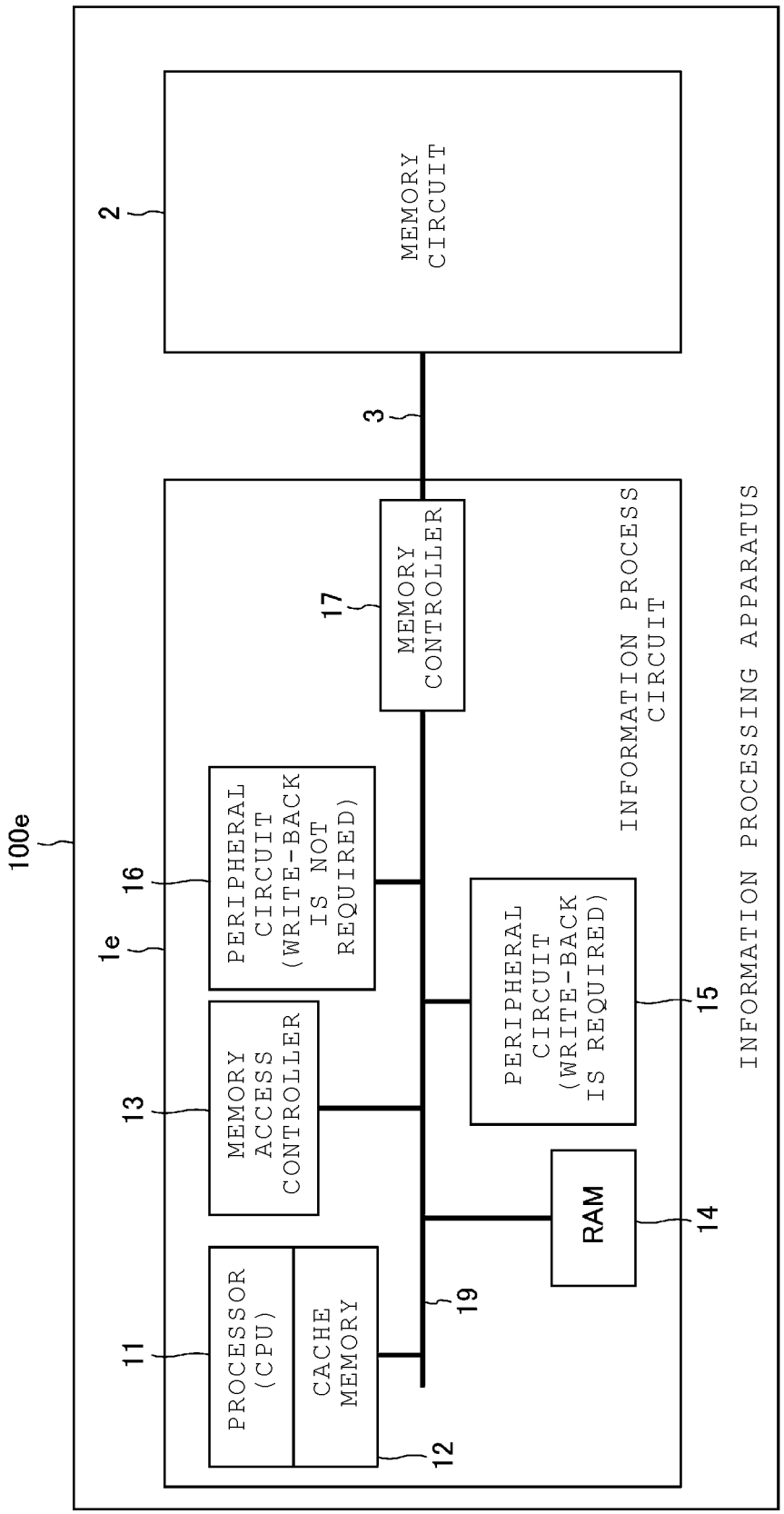
FIG. 17 depicts an information processing circuit of a first example of a fifth embodiment and associated elements thereof.

FIG. 17 illustrates a first example of elements and connection in the information processing circuit 1 of the fifth embodiment and associated elements thereof. The information processing circuit 1 of the fifth embodiment includes a peripheral circuit 16 in addition to the elements described in the first embodiment. Hereinafter, the information processing circuit 1 of the fifth embodiment may be referred to as an information processing circuit 1e to be distinguished from the information processing circuit 1 of the first embodiment. The information processing apparatus 100 of the fifth embodiment may be referred to as an information processing apparatus 100e to be distinguished from the information processing apparatus 100 of the first embodiment.

In the fifth embodiment, the peripheral circuit 15 deals with data that is required to remain stored in the memory circuit 2 even after the data has been read and supplied to the peripheral circuit 15. That is, the peripheral circuit 15 is supplied with data that needs to be written back for continued storage in the memory circuit 2.

The peripheral circuit 16 is connected to the internal bus 19. As with the peripheral circuit 15, the peripheral circuit 16 may be any circuit that implements various functions associated with reading of data from the memory circuit 2. Examples of the peripheral circuit 16 include a display output circuit (graphics generator) or a communication circuit. The peripheral circuit 16 deals with data that is not required to be continuously stored in the memory circuit 2. That is, data that is not required to be written back is supplied to the peripheral circuit 16.

Figure 18:
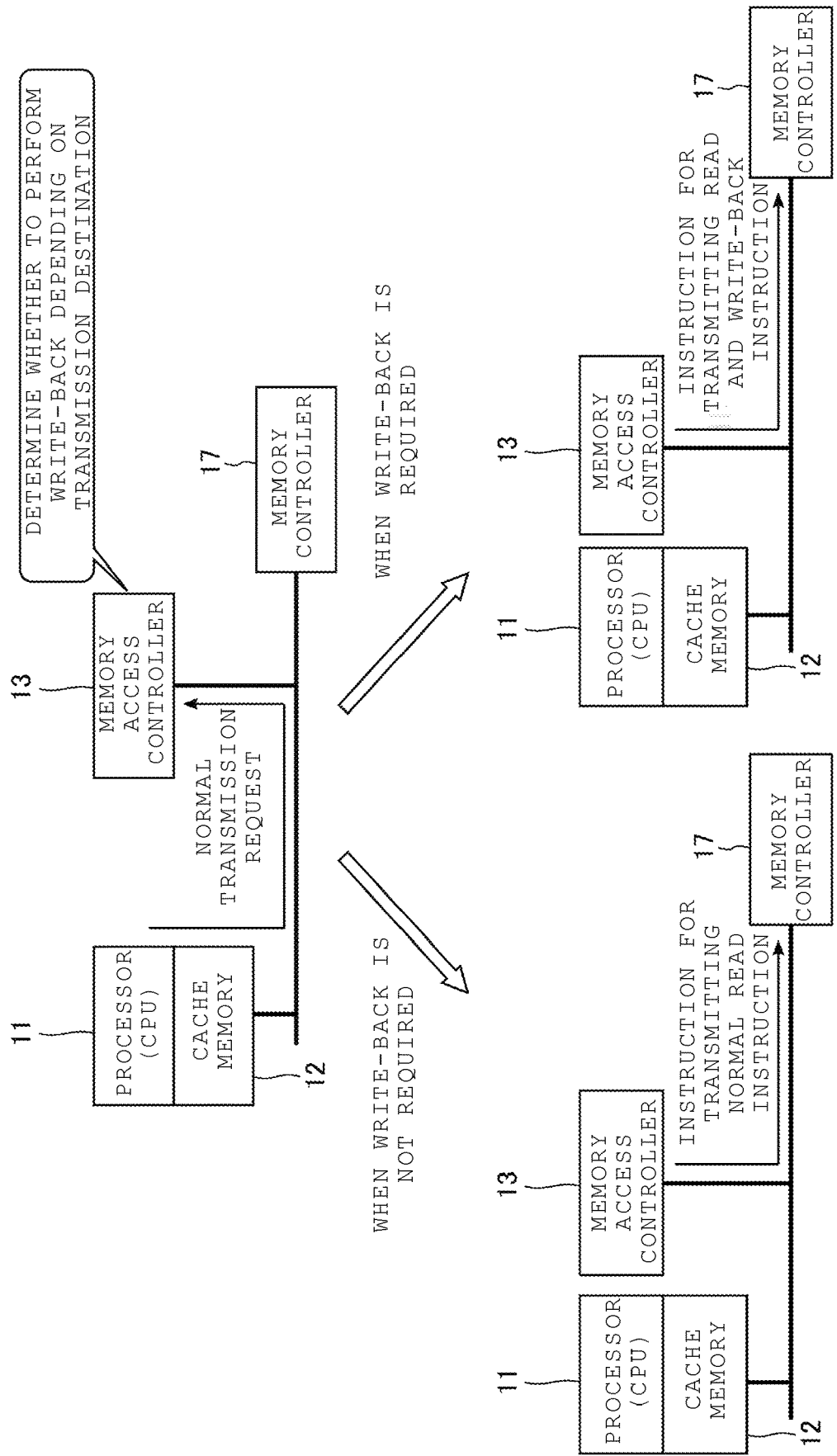
FIG. 18 illustrates an example of a signal flow in an information processing circuit of a fifth embodiment.

As described with reference to FIG. 18, the memory access controller 13 is the element that determines whether the data which is subject to the transmission request is data that is required to be written back. As illustrated in FIG. 18, the processor 11 transmits only a normal transmission request to the memory access controller 13. That is, the processor 11 does not determine the necessity of the writeback of the requested data and simply transmits a (normal) transmission request to the memory access controller 13.

When the transmission request is received, the memory access controller 13 verifies the transmission destination included in the transmission request. The memory access controller 13 stores a transmission destination list for specifying various transmission destinations as requiring writeback or not. The transmission destination list of the present example indicates the destinations for which the data is required to be written back. In this example, the transmission destination list includes information for specifying the peripheral circuit 15. The memory access controller 13 compares the transmission destination included in the transmission request with the transmission destination included in the transmission destination list. When the transmission destination included in the transmission request is not included in the transmission destination list, the memory access controller 13 instructs the memory controller 17 to transmit a normal read instruction, as illustrated in the lower left portion of FIG. 18. However, when the transmission destination included in the transmission request is included in the transmission destination list, the memory access controller 13 instructs the memory controller 17 to transmit a read-write-back instruction, as illustrated in the lower right portion of FIG. 18.

5.1.2. Operation

Figure 19:
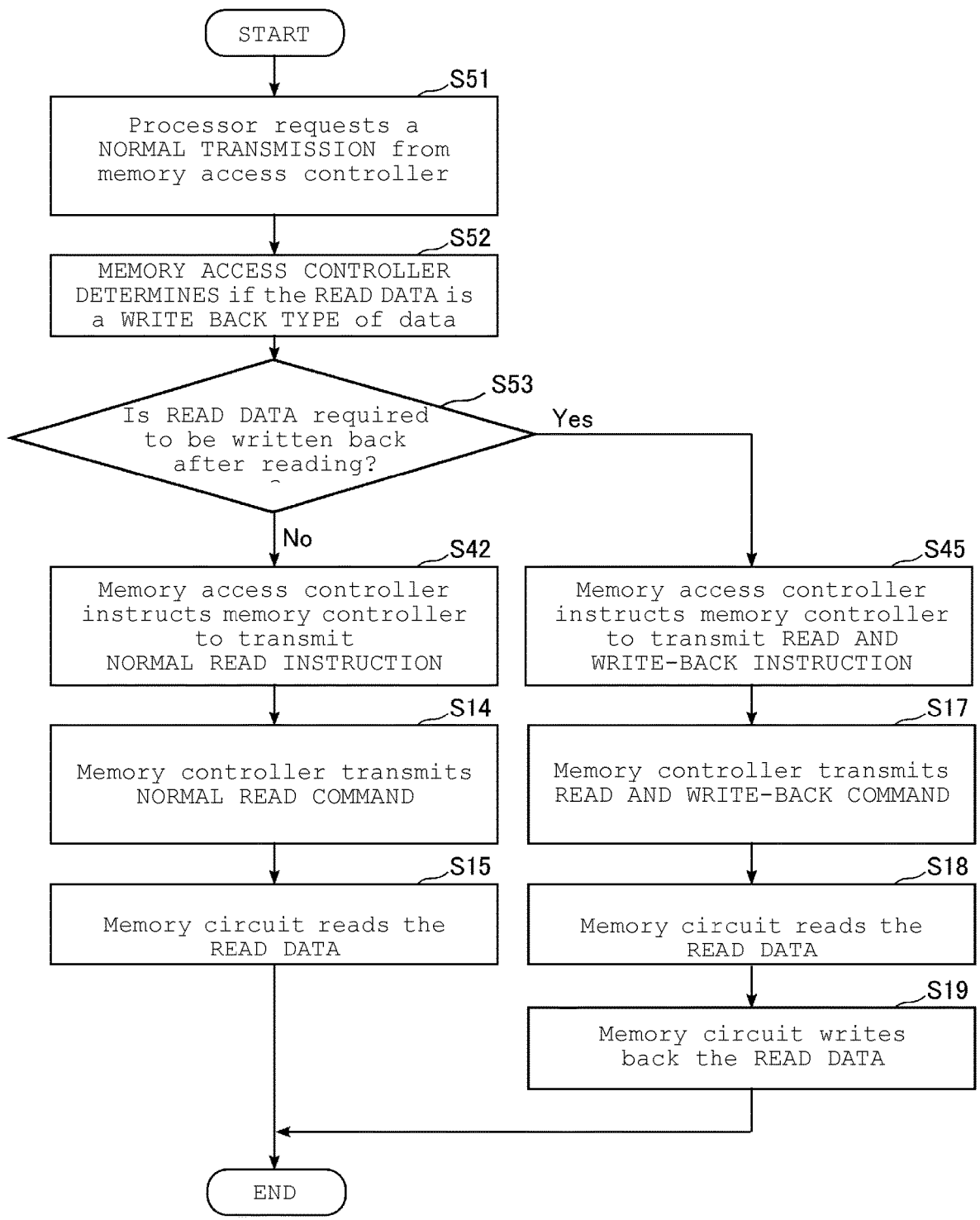
FIG. 19 illustrates a process flow of data reading of a first example type in an information processing apparatus of a fifth embodiment.

FIG. 19 illustrates a processing flow of a data reading of the first example in the information processing apparatus 100 of the fifth embodiment. If the information processing circuit 1 determines to read a certain kind of data from the memory circuit 2, the processing flow of the data reading of FIG. 19 is started.

The processor 11 sends a request for a normal data transmission from the reading source to the memory access controller 13 (Step S51). Step S51 is the same as the transmission of the normal data transmission request described with reference to Step S41 of the fourth embodiment.

The memory controller 17 determines whether the transmission destination designated by the data transmission request is included in the transmission destination list and thus determines whether the data to be read is of a type required to be written back (Step S52). When the data is not required to be written back (No in Step S53), the process proceeds to Step S42. In Steps S42, S14, and S15, the transmission of a normal read instruction is instructed, the normal reading is instructed, and the normal reading is performed. The read data in Step S15 is transmitted to the transmission destination by the control of the memory access controller 13.

However, if the data is required to be written back (Yes in Step S53), the process proceeds to Step S45. In Steps S45, S17, S18, and S19, transmission of the transmission, read, and write-back instruction is instructed, the reading with write-back is instructed, the reading with write-back is performed. In Step S18, the read data controls the memory access controller 13 and is transmitted to the transmission destination.

5.2. Second Example

5.2.1. Configuration

The configuration of the information processing apparatus 100e of a second example of the fifth embodiment is the same as the first example. However, in the second example, the transmission destination is not the peripheral circuit 16, and thus the peripheral circuit 16 may not be provided.

Figure 20:
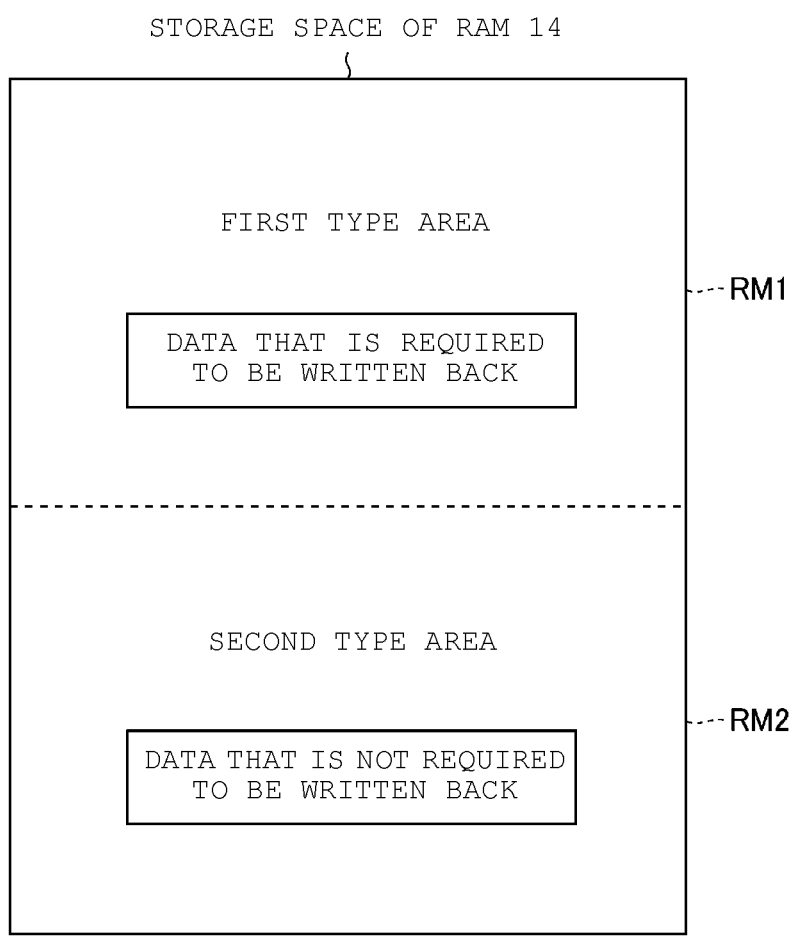
FIG. 20 illustrates an example of a storage space in a fifth embodiment.

FIG. 20 illustrates an example of a storage space provided by the RAM 14 of the fifth embodiment. As illustrated in FIG. 20, the storage space at least includes a first area RM1 and a second area RM2. The first area RM1 and the second area RM2 can be identified by addresses. The first area RM1 and the second area RM2 are used for different applications. For example, the first area RM1 stores the data required to be written back. The second area RM2 stores the data which is not required to be written back.

The plurality of portions included in the first area RM1 in the storage space may have consecutive addresses or may have discrete addresses. The plurality of portions included in the second area RM2 in the storage space may have consecutive addresses or may have discrete addresses. An address of one portion of the second area RM2 may be positioned between respective addresses of two portions of the first area RM1. In the same manner, an address of one portion of the first area RM1 may be positioned between respective addresses of the two portions of the second area RM2.

5.2.2. Operation

The flow of the operation is, in general, the same as the flow of the first example described with reference to FIG. 19. However, the flow of the second example is different from the first example according to the transmission destination used for the determination for the necessity of write-back by the memory access controller 13 in Step S52. In the second example, the transmission destination is the RAM 14. Therefore, the determination in Step S52 is performed based on the address of the transmission destination within the RAM 14. When the transmission destination is included in the first area RM1, the memory access controller 13 determines that the data is required to be written back. When the transmission destination is included in the second area RM2, the memory access controller 13 determines that the data is not required to be written back.

5.3. Advantage

According to the fifth embodiment, the processor 11 requests the normal data transmission from the memory circuit 2 to the memory access controller 13, and the memory access controller 13 reads the data from the memory circuit 2 based on the request. Therefore, the memory access controller 13 determines whether the data subjected to the transmission request is required to be written back based on the transmission destination and instructs the memory circuit 2 for normal reading or reading with write-back based on the determination result. Therefore, even when the memory access controller 13 accesses the memory circuit 2, the same advantage as in the first embodiment can be obtained.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory circuit, comprising:
a plurality of nonvolatile memory cells each of which loses stored data when read; and
a control circuit configured to:
receive a first instruction, then read data from a first memory cell designated by the first instruction but not rewrite the read data back to the plurality of nonvolatile memory cells at any point after the read, and
receive a second instruction, then read data from a second memory cell designated by the second instruction and rewrite the read data back to the plurality of nonvolatile memory cells.

2. The memory circuit according to claim 1, wherein
the first instruction is a first command type, and
the second instruction is a second command type different from the first command type.

3. The memory circuit according to claim 1, wherein
the first instruction includes a read command and a non-write back instruction, and
the second instruction includes a read command and a write-back instruction.

4. The memory circuit according to claim 3, wherein the control circuit further includes a first terminal that receives the non-write back instruction and the write-back instruction.

5. The memory circuit according to claim 1, wherein the physical address of the first memory cell is the same as the physical address of the second memory cell.

6. The memory circuit according to claim 1, wherein the physical address of the first memory cell is different from the physical address of the second memory cell.

7. The memory circuit according to claim 6, wherein
the first instruction includes a read command and first address information, and
a second instruction includes a read command and second address information.

8. An information processing circuit, comprising:
a memory circuit including a plurality of nonvolatile memory cells, each of which loses stored data when stored data is read therefrom, wherein
the memory circuit is configured to:
read data from a first memory cell in the plurality of nonvolatile memory cells when the first memory cell is designated by a first instruction received by the memory circuit, but not rewrite the data back to the plurality of nonvolatile memory cells at any point after the first memory cell has been read, and
read data from a second memory cell in the plurality of nonvolatile memory cells when the second memory cell is designated by a second instruction received by the memory circuit and rewrite the data back to the plurality of nonvolatile memory cells after the second memory cell has been read.

9. The information processing circuit according to claim 8, wherein
the first instruction includes a first command, and
the second instruction includes a second command different from the first command.

10. The information processing circuit according to claim 8, wherein
the first instruction includes a read command and first information that does not include a write instruction, and
the second instruction includes a read command and second information that includes a write instruction.

11. The information processing circuit according to claim 10, further comprising:
a first terminal that outputs the first information and the second information.

12. The information processing circuit according to claim 8, wherein the first memory cell has the same physical address as the second memory cell.

13. The information processing circuit according to claim 8, further comprising:
a processor;
a first circuit that transmits the first instruction and the second instruction; and
a second circuit that instructs the first circuit to transmit the first instruction or the second instruction according to a first request from the processor.

14. An information processing apparatus, comprising:
a memory circuit including:
a plurality of nonvolatile memory cells each of which loses stored data when read; and
a control circuit configured to:
receive a first instruction, then read data from a first memory cell designated by the first instruction but not rewrite the read data back to the plurality of nonvolatile memory cells at any point after the read, and
receive a second instruction, then read data from a second memory cell designated by the second instruction and rewrite the read data back to the plurality of nonvolatile memory cells; and
an information processing circuit configured to transmit the first instruction and the second instruction.

15. The information processing apparatus according to claim 14, wherein
the first instruction includes a first command, and
the second instruction includes a second command different from the first command.

16. The information processing apparatus according to claim 14, wherein
the first instruction includes a read command and first information that does not include a write instruction, and
the second instruction includes a read command and second information that includes a write instruction.

17. The information processing apparatus according to claim 16, wherein the memory circuit and the information processing circuit are connected to each other via a first signal line that transmits the first information and the second information.

18. The information processing apparatus according to claim 14, wherein the first memory cell has the same physical address as the second memory cell.

19. The information processing apparatus according to claim 14, wherein the physical address of the first memory cell is different from the physical address of the second memory cell.

20. The information processing apparatus according to claim 19, wherein
the first instruction includes a read command and first address information, and
the second instruction includes the read command and second address information different from the first address information.

* * * * *